US008157625B2

(12) United States Patent
Hazenbroek et al.

(10) Patent No.: US 8,157,625 B2
(45) Date of Patent: Apr. 17, 2012

(54) METHOD AND APPARATUS FOR COLLECTING MEAT FROM AN ANIMAL PART

(75) Inventors: Jacobus Eliza Hazenbroek, Oud-Beijerland (NL); David Scott Hazenbroek, Oud-Beijerland (NL); Dirk Cornelis Stooker, Puttershoek (NL); Gerrit Hendrik Woltman, Goudswaard (NL)

(73) Assignee: Foodmate BV (NL)

( * ) Notice: Subject to any disclaimer, the term of this patent is extended or adjusted under 35 U.S.C. 154(b) by 0 days.

(21) Appl. No.: 13/011,063

(22) Filed: Jan. 21, 2011

(65) Prior Publication Data
US 2011/0183591 A1    Jul. 28, 2011

(30) Foreign Application Priority Data

Jan. 26, 2010 (NL) ...................................... 2004149
Sep. 30, 2010 (NL) ...................................... 2005429

(51) Int. Cl.
*A22C 25/16* (2006.01)
(52) U.S. Cl. .................................................... 452/136
(58) Field of Classification Search ................... 452/125, 452/127, 135, 136, 138
See application file for complete search history.

(56) References Cited

U.S. PATENT DOCUMENTS

| 3,956,794 A | 5/1976 | Verbakel |
| 3,969,790 A | 7/1976 | Smorenburg |
| 3,979,793 A | 9/1976 | Hazenbroek |
| 3,983,601 A | 10/1976 | Verbakel |
| 3,990,128 A | 11/1976 | van Mil |
| 4,034,440 A | 7/1977 | van Mil |
| 4,118,829 A | 10/1978 | Harben, Jr. |

(Continued)

FOREIGN PATENT DOCUMENTS

DE    91 11 177.3 U1    11/1991

(Continued)

OTHER PUBLICATIONS

International Search Report—PCT/NL2011/050049.

(Continued)

*Primary Examiner* — Richard Price, Jr.
(74) *Attorney, Agent, or Firm* — Womble Carlyle Sandridge & Rice, LLP

(57) ABSTRACT

A method and device are disclosed for mechanically collecting meat from animal parts having an elongated bone extending through a sleeve of meat. The device includes a deboning unit adapted to be associated with a supporting tray for supporting one of the animal parts, a stripper diaphragm on one end of the supporting tray, when associated with the deboning unit, and a movable bone pusher rod and a movable tubular knife on an opposite end of the supporting tray, when associated with the deboning unit. The bone pusher rod and the tubular knife are arranged concentrically about one another. A mechanism is provided for advancing and retracting the bone pusher rod and the tubular knife between first positions, allowing loading of the animal part, and second positions, in which the meat is collected against the stripper diaphragm and the bone is pushed partly through the diaphragm. The mechanism for advancing and retracting is adapted to move the bone pusher rod over one distance and the tubular knife over another distance smaller than the one distance, so as not to extend through the diaphragm. A rotating mechanism can rotate the tubular knife upon engagement with the meat and a cutting anvil for severing the meat from a trailing one of opposite ends of the elongated bone. An engaging member for engaging the bone portion partly protruding through the diaphragm pulls the bone completely through the diaphragm.

41 Claims, 11 Drawing Sheets

U.S. PATENT DOCUMENTS

| | | | |
|---|---|---|---|
| 4,131,973 A | 1/1979 | Verbakel | |
| 4,147,012 A | 4/1979 | van Mil | |
| 4,153,971 A | 5/1979 | Simonds | |
| 4,153,972 A | 5/1979 | Harben et al. | |
| 4,178,659 A | 12/1979 | Simonds | |
| 4,203,178 A | 5/1980 | Hazenbroek | |
| 4,283,813 A | 8/1981 | House | |
| 4,292,709 A | 10/1981 | van Mil | |
| 4,388,811 A | 6/1983 | Zebarth | |
| 4,395,795 A | 8/1983 | Hazenbroek | |
| 4,406,037 A | 9/1983 | Hazenbroek | |
| 4,418,444 A | 12/1983 | Meyn et al. | |
| 4,418,445 A | 12/1983 | Meyn et al. | |
| 4,434,526 A | 3/1984 | van Mil | |
| 4,439,891 A | 4/1984 | van Mil | |
| 4,468,838 A | 9/1984 | Sjöström et al. | |
| 4,510,886 A | 4/1985 | van Mil | |
| 4,514,879 A | 5/1985 | Hazenbroek | |
| 4,516,290 A | 5/1985 | van Mil | |
| 4,524,489 A | 6/1985 | van Mil | |
| 4,558,490 A | 12/1985 | Hazenbroek et al. | |
| 4,559,672 A | 12/1985 | Hazenbroek et al. | |
| 4,567,624 A | 2/1986 | van Mil | |
| 4,570,295 A | 2/1986 | van Mil | |
| 4,574,429 A | 3/1986 | Hazenbroek | |
| 4,577,368 A | 3/1986 | Hazenbroek | |
| D283,289 S | 4/1986 | Hazenbroek | |
| 4,593,432 A | 6/1986 | Hazenbroek | |
| 4,597,133 A | 7/1986 | van de Nieuwelaar | |
| 4,597,136 A | 7/1986 | Hazenbroek | |
| 4,635,317 A | 1/1987 | van der Eerden | |
| 4,639,973 A | 2/1987 | van der Eerden | |
| 4,639,974 A | 2/1987 | Olson | |
| 4,639,975 A | 2/1987 | van der Eerden | |
| 4,646,384 A | 3/1987 | van der Eerden | |
| 4,651,383 A | 3/1987 | van der Eerden | |
| 4,653,147 A | 3/1987 | van der Eerden | |
| 4,682,386 A | 7/1987 | Hazenbroek et al. | |
| 4,704,768 A | 11/1987 | Hutting et al. | |
| 4,723,339 A | 2/1988 | van de Nieuwelaar et al. | |
| 4,724,581 A | 2/1988 | van de Nieuwelaar | |
| 4,736,492 A | 4/1988 | Hazenbroek | |
| RE32,697 E | 6/1988 | Hazenbroek et al. | |
| 4,765,028 A | 8/1988 | van de Nieuwelaar et al. | |
| 4,766,644 A | 8/1988 | van den Nieuwelaar et al. | |
| 4,769,872 A | 9/1988 | Hazenbroek et al. | |
| 4,779,308 A | 10/1988 | van de Nieuwelaar et al. | |
| 4,788,749 A | 12/1988 | Hazenbroek et al. | |
| 4,811,456 A | 3/1989 | Huevel | |
| 4,811,458 A | 3/1989 | v. d. Nieuwelaar et al. | |
| 4,811,462 A | 3/1989 | Meyn | |
| 4,813,101 A | 3/1989 | Brakels et al. | |
| 4,884,318 A | 12/1989 | Hazenbroek | |
| 4,893,378 A * | 1/1990 | Hazenbroek et al. | 452/136 |
| 4,894,885 A | 1/1990 | Markert | |
| 4,896,399 A | 1/1990 | Hazenbroek | |
| 4,899,421 A | 2/1990 | Van Der Eerden | |
| 4,901,399 A | 2/1990 | Hegelmann | |
| 4,918,787 A | 4/1990 | Hazenbroek | |
| 4,928,351 A | 5/1990 | van den Nieuwelaar et al. | |
| 4,935,990 A | 6/1990 | Linnenbank | |
| 4,939,813 A | 7/1990 | Hazenbroek | |
| 4,958,694 A | 9/1990 | van den Nieuwelaar et al. | |
| 4,965,908 A | 10/1990 | Meyn | |
| 4,972,549 A | 11/1990 | Van Den Nieuwelaar et al. | |
| 4,993,113 A * | 2/1991 | Hazenbroek | 452/136 |
| 4,993,115 A | 2/1991 | Hazenbroek | |
| 5,001,812 A | 3/1991 | Hazenbroek | |
| 5,013,431 A | 5/1991 | Doets | |
| 5,015,213 A | 5/1991 | Hazenbroek | |
| 5,019,013 A | 5/1991 | Hazenbroek | |
| 5,026,983 A | 6/1991 | Meyn | |
| 5,035,673 A | 7/1991 | Hazenbroek | |
| 5,037,351 A | 8/1991 | van Den Nieuwelaar et al. | |
| 5,041,054 A | 8/1991 | van den Nieuwelaar et al. | |
| 5,045,022 A | 9/1991 | Hazenbroek | |
| 5,060,596 A | 10/1991 | Esbroeck | |
| 5,064,402 A | 11/1991 | Koops | |
| 5,067,927 A | 11/1991 | Hazenbroek et al. | |
| 5,069,652 A | 12/1991 | Hazenbroek | |
| 5,074,823 A | 12/1991 | Meyn | |
| 5,088,959 A | 2/1992 | Heemskerk | |
| 5,090,940 A | 2/1992 | Adkison | |
| 5,098,333 A | 3/1992 | Cobb | |
| 5,104,351 A | 4/1992 | van den Nieuwelaar et al. | |
| 5,122,090 A | 6/1992 | van de Nieuwelaar et al. | |
| 5,123,871 A | 6/1992 | van den Nieuwelaar et al. | |
| 5,125,498 A | 6/1992 | Meyn | |
| 5,147,240 A | 9/1992 | Hazenbroek et al. | |
| 5,147,241 A | 9/1992 | Rudin | |
| 5,154,664 A | 10/1992 | Hazenbroek et al. | |
| 5,154,665 A | 10/1992 | Hazenbroek | |
| RE34,149 E | 12/1992 | Markert | |
| 5,173,076 A | 12/1992 | Hazenbroek | |
| 5,173,077 A | 12/1992 | van den Nieuwelaar et al. | |
| 5,176,563 A | 1/1993 | van den Nieuwelaar et al. | |
| 5,176,564 A | 1/1993 | Hazenbroek | |
| 5,178,890 A | 1/1993 | van den Nieuwelaar et al. | |
| 5,186,679 A | 2/1993 | Meyn | |
| 5,188,559 A | 2/1993 | Hazenbroek | |
| 5,188,560 A | 2/1993 | Hazenbroek | |
| 5,194,035 A | 3/1993 | Dillard | |
| 5,197,917 A | 3/1993 | Verbakel et al. | |
| 5,199,922 A | 4/1993 | Korenberg et al. | |
| 5,222,905 A | 6/1993 | Van den Nieuwelaar et al. | |
| 5,242,324 A | 9/1993 | Koops | |
| 5,248,277 A | 9/1993 | Bos et al. | |
| 5,256,101 A | 10/1993 | Koops | |
| 5,269,721 A | 12/1993 | Meyn | |
| 5,277,649 A | 1/1994 | Adkison | |
| 5,277,650 A | 1/1994 | Meyn | |
| 5,279,517 A | 1/1994 | Koops | |
| 5,290,187 A | 3/1994 | Meyn | |
| 5,299,975 A | 4/1994 | Meyn | |
| 5,299,976 A | 4/1994 | Meyn | |
| 5,318,428 A | 6/1994 | Meyn | |
| 5,326,311 A | 7/1994 | Persoon et al. | |
| 5,334,083 A | 8/1994 | van den Nieuwelaar et al. | |
| 5,336,127 A | 8/1994 | Hazenbroek | |
| 5,340,351 A | 8/1994 | Minderman et al. | |
| 5,340,355 A | 8/1994 | Meyn | |
| 5,342,237 A | 8/1994 | Kolkman | |
| 5,344,359 A | 9/1994 | Kolkman | |
| 5,344,360 A | 9/1994 | Hazenbroek | |
| 5,366,406 A | 11/1994 | Hobbel et al. | |
| 5,370,574 A | 12/1994 | Meyn | |
| 5,372,246 A | 12/1994 | van Aalst | |
| RE34,882 E | 3/1995 | Meyn | |
| 5,401,210 A * | 3/1995 | Manmoto et al. | 452/136 |
| 5,429,549 A | 7/1995 | Verrijp et al. | |
| 5,439,702 A | 8/1995 | French | |
| 5,453,045 A | 9/1995 | Hobbel et al. | |
| 5,462,477 A | 10/1995 | Ketels | |
| 5,470,194 A | 11/1995 | Zegers | |
| 5,487,700 A | 1/1996 | Dillard | |
| 5,505,657 A | 4/1996 | Janssen et al. | |
| 5,549,521 A | 8/1996 | van den Nieuwelaar et al. | |
| D37,388 S | 9/1996 | Dillard | |
| 5,569,067 A | 10/1996 | Meyn | |
| 5,595,066 A | 1/1997 | Zwanikken et al. | |
| 5,605,503 A | 2/1997 | Martin | |
| 5,643,072 A | 7/1997 | Lankhaar et al. | |
| 5,643,074 A | 7/1997 | Linnenbank | |
| 5,672,098 A | 9/1997 | Veraart | |
| 5,676,594 A | 10/1997 | Joosten | |
| 5,704,830 A | 1/1998 | Van Ochten | |
| 5,713,786 A | 2/1998 | Kikstra | |
| 5,713,787 A | 2/1998 | Schoenmakers et al. | |
| 5,741,176 A | 4/1998 | Lapp et al. | |
| 5,755,617 A | 5/1998 | van Harskamp et al. | |
| 5,759,095 A | 6/1998 | De Weerd | |
| 5,766,063 A | 6/1998 | Hazenbroek et al. | |
| 5,782,685 A | 7/1998 | Hazenbroek et al. | |
| 5,785,588 A | 7/1998 | Jacobs et al. | |
| 5,803,802 A | 9/1998 | Jansen | |
| 5,810,651 A | 9/1998 | De Heer et al. | |
| 5,810,653 A | 9/1998 | Van Craaikamp et al. | |

| Patent/Pub No. | Date | Name |
|---|---|---|
| 5,813,908 A | 9/1998 | Craaikamp |
| 5,827,116 A | 10/1998 | Al et al. |
| 5,833,527 A | 11/1998 | Hazenbroek et al. |
| 5,865,672 A | 2/1999 | Hazenbroek |
| 5,875,738 A | 3/1999 | Hazenbroek et al. |
| 5,947,811 A | 9/1999 | Hazenbroek et al. |
| 5,951,393 A | 9/1999 | Barendregt |
| 5,975,029 A | 11/1999 | Morimoto et al. |
| 5,976,004 A * | 11/1999 | Hazenbroek ............ 452/136 |
| 5,980,377 A | 11/1999 | Zwanikken et al. |
| 6,007,416 A | 12/1999 | Janssen et al. |
| 6,007,417 A | 12/1999 | Jones et al. |
| 6,024,636 A * | 2/2000 | Hazenbroek et al. ......... 452/138 |
| 6,027,403 A | 2/2000 | Hazenbroek et al. |
| 6,027,404 A | 2/2000 | Wols |
| 6,029,795 A | 2/2000 | Janssen et al. |
| 6,062,972 A | 5/2000 | Visser |
| 6,095,914 A | 8/2000 | Cornelissen et al. |
| 6,126,534 A | 10/2000 | Jacobs et al. |
| 6,132,304 A | 10/2000 | Aarts et al. |
| 6,142,863 A | 11/2000 | Janssen et al. |
| 6,152,816 A | 11/2000 | van den Nieuwelaar et al. |
| 6,176,772 B1 | 1/2001 | Hazenbroek et al. |
| 6,179,702 B1 | 1/2001 | Hazenbroek |
| 6,190,250 B1 | 2/2001 | Volk et al. |
| 6,193,595 B1 | 2/2001 | Volk et al. |
| 6,220,953 B1 | 4/2001 | Cornelissen et al. |
| 6,231,436 B1 | 5/2001 | Bakker |
| 6,254,471 B1 | 7/2001 | Meyn |
| 6,254,472 B1 | 7/2001 | Meyn |
| 6,277,021 B1 | 8/2001 | Meyn |
| 6,299,524 B1 | 10/2001 | Janssen et al. |
| 6,306,026 B1 | 10/2001 | Post |
| 6,322,438 B1 | 11/2001 | Barendregt |
| 6,358,136 B1 | 3/2002 | Volk et al. |
| 6,371,843 B1 | 4/2002 | Volk et al. |
| 6,375,560 B1 | 4/2002 | Verrijp |
| 6,383,069 B1 | 5/2002 | Volk et al. |
| 6,398,636 B1 | 6/2002 | Jansen et al. |
| 6,446,352 B2 | 9/2002 | Middelkoop et al. |
| 6,478,668 B2 | 11/2002 | Visser et al. |
| 6,599,179 B1 | 7/2003 | Hazenbroek et al. |
| 6,612,919 B2 | 9/2003 | Jansen et al. |
| 6,656,032 B2 | 12/2003 | Hazenbroek et al. |
| 6,726,556 B2 | 4/2004 | Gooren et al. |
| 6,736,717 B1 | 5/2004 | Annema et al. |
| 6,764,393 B1 | 7/2004 | Hazenbroek et al. |
| 6,783,451 B2 | 8/2004 | Aandewiel et al. |
| 6,811,478 B2 | 11/2004 | van den Nieuwelaar et al. |
| 6,811,480 B2 | 11/2004 | Moriarty |
| 6,811,802 B2 | 11/2004 | van Esbroeck et al. |
| 6,830,508 B2 | 12/2004 | Hazenbroek et al. |
| 6,837,782 B2 | 1/2005 | Hetterscheid et al. |
| 6,899,613 B2 | 5/2005 | van den Nieuwelaar et al. |
| 6,912,434 B2 | 6/2005 | van den Nieuwelaar et al. |
| 986,707 A1 | 1/2006 | van den Nieuwelaar et al. |
| 7,018,283 B2 | 3/2006 | Schmidt et al. |
| 7,029,387 B2 | 4/2006 | van den Nieuwelaar et al. |
| 7,059,954 B2 | 6/2006 | Annema et al. |
| 7,063,611 B2 | 6/2006 | Nolten et al. |
| 7,066,806 B2 | 6/2006 | de Heer et al. |
| 7,070,493 B2 | 7/2006 | Hazenbroek et al. |
| 7,115,030 B2 | 10/2006 | van Hillo et al. |
| 7,125,330 B2 | 10/2006 | Beeksma et al. |
| 7,128,937 B2 | 10/2006 | van den Nieuwelaar et al. |
| 7,133,742 B2 | 11/2006 | Cruysen et al. |
| 7,172,781 B2 | 2/2007 | Kish |
| 7,232,365 B2 | 6/2007 | Annema et al. |
| 7,232,366 B2 | 6/2007 | van den Nieuwelaar et al. |
| 7,249,998 B2 | 7/2007 | van Esbroeck et al. |
| 7,261,629 B2 | 8/2007 | Holleman |
| 7,284,973 B2 | 10/2007 | van Esbroeck et al. |
| 7,302,885 B2 | 12/2007 | Townsend |
| 7,344,437 B2 | 3/2008 | Van den Nieuwelaar et al. |
| D565,941 S | 4/2008 | Peters et al. |
| 7,357,707 B2 | 4/2008 | de Vos et al. |
| 7,476,148 B2 | 1/2009 | McQuillan et al. |
| 7,494,406 B2 | 2/2009 | Van Esbroeck et al. |
| 7,530,888 B2 | 5/2009 | Annema et al. |
| 7,572,176 B2 | 8/2009 | Petersen et al. |
| 7,662,033 B1 | 2/2010 | Ritter et al. |
| 7,662,034 B1 | 2/2010 | Van Hillo et al. |
| 7,717,773 B2 | 5/2010 | Woodford et al. |
| 7,740,527 B1 | 6/2010 | Harben |
| 7,744,449 B2 | 6/2010 | van Esbroeck et al. |
| 7,824,251 B2 | 11/2010 | van den Nieuwelaar et al. |
| 2001/0023171 A1 | 9/2001 | Hazenbroek et al. |
| 2002/0055328 A1 | 5/2002 | Schmidt et al. |
| 2002/0058470 A1 | 5/2002 | Schmidt et al. |
| 2002/0090905 A1 | 7/2002 | Moriarty |
| 2002/0168930 A1 | 11/2002 | Jansen et al. |
| 2003/0008606 A1 | 1/2003 | Hazenbroek et al. |
| 2003/0084856 A1 | 5/2003 | Hazenbroek et al. |
| 2003/0092372 A1 | 5/2003 | Aandewiel et al. |
| 2004/0198209 A1 | 10/2004 | Hazenbroek et al. |
| 2004/0235409 A1 | 11/2004 | Nolten et al. |
| 2005/0037704 A1 | 2/2005 | Heer et al. |
| 2005/0037705 A1 | 2/2005 | Beeksma et al. |
| 2005/0048894 A1 | 3/2005 | van Hillo et al. |
| 2005/0186897 A1 | 8/2005 | Holleman |
| 2005/0221748 A1 | 10/2005 | Hillo et al. |
| 2006/0099899 A1 | 5/2006 | Hazenbroek et al. |
| 2006/0217051 A1 | 9/2006 | Gerrits |
| 2007/0082595 A1 | 4/2007 | de Vos et al. |
| 2007/0221071 A1 | 9/2007 | Kuijpers et al. |
| 2007/0224306 A1 | 9/2007 | van Esbroeck et al. |
| 2008/0017050 A1 | 1/2008 | van Esbroeck et al. |
| 2008/0125025 A1 | 5/2008 | Van Den Nieuwelaar et al. |
| 2008/0171506 A1 | 7/2008 | Nieuwelaar et al. |
| 2009/0239457 A1 | 9/2009 | Jansen et al. |
| 2009/0298404 A1 | 12/2009 | Van Der Stouw |
| 2009/0320761 A1 | 12/2009 | Grave et al. |
| 2010/0022176 A1 | 1/2010 | Van Den Nieuwelaar et al. |
| 2010/0029186 A1 | 2/2010 | Janssen et al. |
| 2010/0048114 A1 | 2/2010 | Van Den Nieuwelaar et al. |
| 2010/0062699 A1 | 3/2010 | Sorensen et al. |
| 2010/0075584 A1 | 3/2010 | Aandewiel et al. |
| 2010/0081366 A1 | 4/2010 | De Vos et al. |
| 2010/0120344 A1 | 5/2010 | Van Den Nieuwelaar et al. |
| 2010/0151779 A1 | 6/2010 | Bakker |
| 2010/0221991 A1 | 9/2010 | Hagendoorn |

FOREIGN PATENT DOCUMENTS

| | | |
|---|---|---|
| DE | 196 39 472 A1 | 7/1997 |
| EP | 0 439 784 A1 | 8/1991 |
| EP | 0 786 208 A1 | 7/1997 |
| EP | 2 181 841 A1 | 5/2010 |

OTHER PUBLICATIONS

Written Opinion—PCT/NL2011/050049.

* cited by examiner

METHOD AND APPARATUS FOR COLLECTING MEAT FROM AN ANIMAL PART

REFERENCE TO RELATED APPLICATION

Priority is hereby claimed under 35 USC §119 to the filing date of Dutch patent application number N2005429 filed in the Netherlands on 30 Sep. 2010 and to the filing date of Dutch patent application N2004149 filed in the Netherlands on 26 Jan. 2010.

TECHNICAL FIELD

This disclosure relates generally to poultry processing equipment and more particularly to a method and device for mechanically collecting meat from an animal part having an elongated bone extending through a sleeve of meat. The apparatus and method are particularly applicable to deboning the thighs of chickens and other poultry.

BACKGROUND

Devices and methods for collecting meat from animal parts having an elongated bone extending through a sleeve of meat have been known for some time. The known devices either use grippers for holding and pulling the bone and/or require bone pusher rods that push the bone completely through the central aperture of a rubber meat stripper diaphragm to ensure that the bone is reliably stripped and separated completely from the meat. Contact between bone grippers, or bone pusher rods, and the rubber or elastomeric meat stripper diaphragms severely limit their duration of use. Not only are these meat stripper diaphragms relatively expensive to replace, but their replacement entails down-time for the meat processing lines in which they are used. Accordingly there is a need for an improved device and method for mechanically collecting meat from animal parts having an elongated bone extending through a sleeve of meat. In a more general sense, there is a need for a device and method to overcome or ameliorate at least one of the disadvantages of the prior art. There is a further need for a bone stripper apparatus and method with alternative structures that are less cumbersome in assembly and operation and that moreover can be made relatively inexpensively. Alternatively, there is a commercial need for such an apparatus and method that provides the public with a useful and meaningful choice. It is to the provision of a method and apparatus that addresses these and other needs that the present disclosure is primarily directed.

SUMMARY

Dutch patent application numbers N2004149 and N2005429, to which priority is claimed above, are hereby incorporated by reference in their entireties.

An apparatus is disclosed for mechanically collecting meat from animal parts that have an elongated bone extending through a sleeve of meat. A poultry thigh is an example of such an animal part. The apparatus includes means for positioning at least one of the animal parts for engagement by a deboning unit having a bone pusher and a tubular knife arranged concentrically about the bone pusher. The positioning means is arranged for aligning the bone of the animal part with one longitudinal end in alignment with both the bone pusher and the tubular knife. The other end of the bone is aligned with a meat stripper diaphragm. A cam track and follower arrangement is arranged for moving the bone pusher and the meat stripper diaphragm towards and away from one another over a first distance. The first distance is determined to push the bone with the bone pusher only partly through the meat stripper diaphragm. A mechanism is provided for moving the tubular knife and the meat stripper diaphragm towards and away from one another, simultaneously with the bone pusher, over a second distance that is smaller than the first distance. A mechanism is also provided for rotating the tubular knife as it engages with the meat stripper diaphragm to sever the meat from the end of the bone adjacent the bone pusher. An engaging member is positioned below the diaphragm for engaging the portion of the bone partly extending through the diaphragm, thereby releasing the bone completely from the diaphragm. In such a device the stripper diaphragm is only contacted by animal tissue and animal bones, which significantly reduces wear and deterioration.

The apparatus may further include a supporting tray for supporting one of the animal parts with the deboning unit being adapted to engage the supporting tray. The means for moving the bone pusher and the meat stripper diaphragm relative to one another, and for simultaneously moving the tubular knife and the meat stripper diaphragm relative to one another, may advantageously comprise a mechanism for advancing and retracting the bone pusher rod and the tubular knife between a first position, allowing engagement between the supporting tray and the deboning unit, and a second position, in which the meat of an animal part when supported on the supporting tray is collected against the meat stripper diaphragm and the bone is pushed only partly through the diaphragm. The mechanism for advancing and retracting is adapted to move the bone pusher over the first distance and the tubular knife over the second distance. The second distance is smaller than the first distance, so that the bone pusher movement is limited in the second position such that it does not extend through the stripper diaphragm. It is further preferred that the meat stripper diaphragm confronts the bone pusher and tubular knife so that rotation of the tubular knife upon engagement with the diaphragm severs the meat around a trailing end of the elongated bone before the bone is engaged by the engaging member.

In a more specific sense it is advantageous when the mechanism for advancing and retracting includes a first cam track and cam follower for moving the bone pusher rod and a second cam track and cam follower for moving the tubular knife. Further, the mechanism is laid out so that it can be exposed for easy cleaning to ensure hygienic conditions that are required in food processing. In such an arrangement the bone pusher rod can be advanced and retracted by a first cam follower wheel engaging the first cam track and acting on a first carriage. The tubular knife can then be advanced and retracted by a second cam follower wheel engaging the second cam track and acting on a second carriage. The first and second carriages may preferably be guided for sliding movement along a pair of first and second guiding rods.

It is convenient if the first and second cam tracks on the one hand and the deboning unit on the other hand are arranged to be relatively movable with respect to one another. More preferably, the first and second cam tracks are held in a stationary position and the deboning unit is arranged for movement in a path of movement extending along the cam tracks. In this regard a favorable arrangement is for the first and second cam tracks to be arranged on a periphery of a stationary drum around which the deboning unit, or a plurality of deboning units, can move in the nature of a carrousel. In a particular combination of features, the mechanism for rotating the tubular knife may be a toothed gear-like element in the configuration of an arcuate segment associated with the periphery of the stationary drum.

It is further advantageous when the supporting tray and the deboning unit are adapted to engage one another with the stripper diaphragm, at least during operation, adjacent one end of the supporting tray and the bone pusher rod and tubular knife adjacent an opposite end of the supporting tray. It may also be advantageous when the supporting tray is one of a plurality of supporting trays, and the deboning unit is one of a plurality of deboning units. In this regard, the plurality of supporting trays may also be greater in number than the plurality of deboning units. Alternatively and advantageously in such an arrangement the plurality of supporting trays can be mounted for movement through a first path that includes a loading path, and the plurality of deboning units can be mounted for movement through a second path.

In a device according to a preferred embodiment of the disclosure, each deboning unit may be secured to a carrousel that is arranged to rotate about the fixed drum. Similarly each supporting tray can be arranged on an endless conveyor loop that may conveniently be driven by the rotating carrousel. In particular this can be arranged when each supporting tray is adapted to align with and be engaged by a corresponding one of the deboning units as the tray is conveyed around the carrousel.

Each of these measures in particular contributes to allowing a larger area for loading the device with animal parts since the loading path along which the trays move can be spaced from the drum and the deboning units. This makes the operation of loading safer to the operating person or persons, enables the work of loading to be performed by co-workers, and/or allows the operating speed of the device to be increased.

In another arrangement the device according to the invention may also have its first and second paths being identical, with the plurality of supporting trays, in number, equaling the number of deboning units and with the supporting trays arranged as a part of it corresponding deboning unit. In this embodiment, there is no separate loading path along which the supporting trays are moved before engaging with the deboning units.

With respect to all embodiments of the invention it can be advantageous when the meat stripper diaphragm is part of the deboning unit.

It is further advantageous when the tubular knife has a circumferential cutting edge and/or when the rotating mechanism for rotating the tubular knife includes a gear pinion on an end of the tubular knife opposite the circumferential cutting edge. The rotating knife surrounds the trailing end of the bone and efficiently cuts lose the meat from around the bone. This not only allows the bone to be more easily removed from the diaphragm, but also increases the yield of meat by reducing remnants that otherwise may adhere to the trailing end of the bone.

It is also advantageous when the rotating mechanism for rotating the tubular knife further includes a toothed element for engaging the gear pinion and more specifically for the toothed element to be a stationary arcuate toothed rack. Such an arrangement is simple and can make use of the progressive movement of the deboning units through a path of travel through the deboning device, without requiring separate drive motors or transmissions. The pinions on the rotary knives simply engage the arcuate toothed rack as the deboning units move around their carrousel to rotate the knives at the appropriate time in the deboning process. In one specific but non-limiting embodiment, the gear pinion is a chain pinion and when the toothed element is part of the chain. Such a chain can be a relatively inexpensive standard element and is not required to extend along a straight path so that it can wrap easily around the drum. While the chain can conceivably also be driven, to increase or reduce the rotating speed of the tubular knife, it is preferred in one embodiment that the chain or at least a portion thereof is held stationary on a chain support. In this regard, the toothed element is positioned in or adjacent to a path of movement through which each deboning unit moves when rotating about the drum.

The engaging member may be positioned on the opposite side of the diaphragm from the deboning unit or units for deflecting or removing the bone from the stripper diaphragm. It is preferably also positioned in a path of movement through which the or each of the deboning units moves so as to engage bones protruding from the diaphragms after the rotary knife has cut meat from around the trailing knuckles of the bones on the opposite sides of the diaphragms.

The meat stripping diaphragm may comprise a rubber or elastomeric disk, having a central aperture, which disk is replaceably held in a mounting collar. Even though the invention has substantially improved the service life of the rubber or elastomeric disc used in the stripper diaphragm, occasional replacement may still be required. The use of a mounting collar may enhance and ensure that such replacements can be performed rapidly and economically. To increase the service life of the stripper diaphragm further, a side of the stripping diaphragm facing the tubular knife is preferably covered by a relatively rigid annular cutting surface or anvil, arranged for engagement by the cutting edge of the rotating tubular knife facilitate cutting of the meat and tendons from around the trailing knuckle of the bone. The annular anvil may be constructed of nylon or other suitable polyamide material ring overlying a peripheral portion of the elastomeric disc.

The invention also relates to an apparatus for mechanically collecting meat from animal parts, including a device as recited above, and wherein the stationary drum of the device is positioned with its geometric axis in a generally horizontal orientation and parallel to a longitudinally extending discharge conveyer, onto which the collected meat is discharged. Such an apparatus may also further include a supply conveyer extending parallel to the geometric axis of the stationary drum, from which the revolving deboning units can be loaded in a generally radial direction with respect to the stationary drum.

The invention further relates to a method of mechanically collecting meat from animal parts that have an elongated bone with opposite longitudinal ends extending through a sleeve of meat. The method may include positioning one of the animal parts for engagement by a deboning unit having a bone pusher and a tubular knife arranged concentrically thereabout. The bone of the animal part is positioned with one longitudinal end in alignment with the bone pusher and the tubular knife, and the other longitudinal of the bone is aligned with a meat stripper diaphragm opposite the bone pusher and tubular knife. The bone pusher and the meat stripper diaphragm are moved toward one another over a first distance and, simultaneously. The tubular knife and the stripper diaphragm, and particular the annular anvil, are moved towards one another over a second distance that is smaller than the first distance. The bone is thereby pushed only partly through the diaphragm. The tubular knife is rotated as it comes into engagement with the annular anvil to cut the meat from around a trailing one of opposite ends of the elongated bone. The bone pusher and the meat stripper diaphragm are then moved away from one another and simultaneously the tubular knife and annular anvil are moved away from one another. The bone, now substantially freed of connecting meat, tendons, and the like, is engaged by the bone engaging member on the opposite side of the stripper disc to pull or urge the bone completely through the diaphragm. In such a method it may be particularly advantageous to include discharging the collected meat onto a conveyor.

The method according to the invention may be further improved by also providing a supporting tray and loading one of the animal parts onto the supporting tray, prior to positioning the animal part and the supporting tray for engagement by the deboning unit between the bone pusher and the meat stripper diaphragm.

Likewise it is advantageous when, in the method according to the invention, the steps of relatively moving the bone pusher and the meat stripper diaphragm towards or away from one another and simultaneously moving the tubular knife and the meat stripper diaphragm towards or away from one another are accomplished respectively by simultaneously advancing and simultaneously retracting the bone pusher and the tubular knife towards or away from the meat stripper diaphragm.

Further advantageous aspects of the invention will become clear from the detailed description of preferred embodiments set forth below taken in conjunction with the accompanying drawings, which are briefly described as follows.

DETAILED DESCRIPTION

Figure 1:
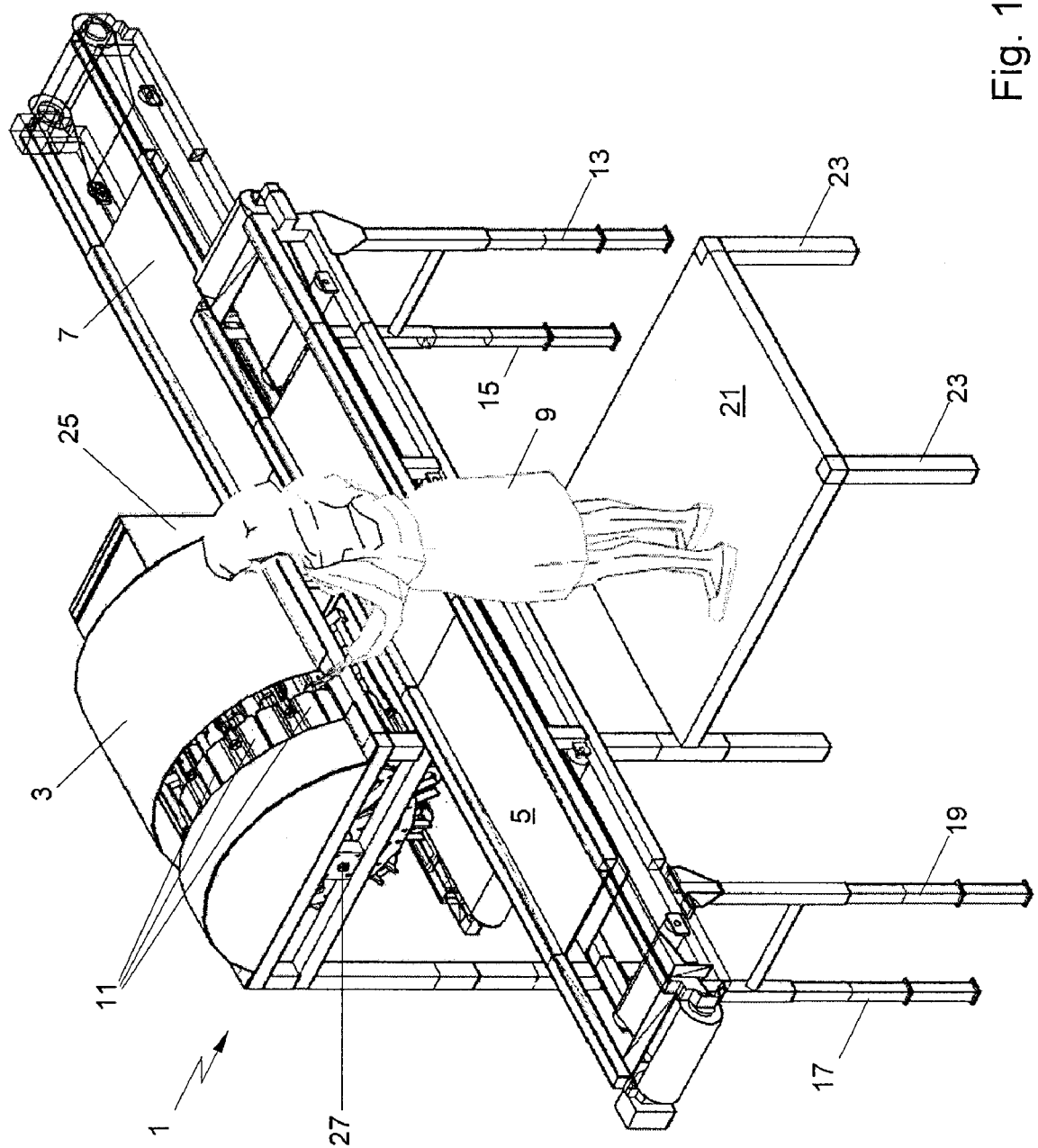
FIG. 1 is a perspective view illustrating an apparatus for mechanically collecting meat from animal parts according to one embodiment of the invention.

Referring to FIG. 1, there is shown an apparatus 1 for mechanically collecting meat from animal parts with an elongated bone extending through a sleeve of meat according to one embodiment of the invention. The apparatus 1 includes a generally drum-shaped deboning device 3, a first or supply conveyor 5 and a second or discharge conveyor 7. An operating person 9 can take a position in front of the supply conveyor 5 to pick up animal parts supplied by the supply conveyor and position these animal parts into deboning units 11 of the deboning device. The deboning units are rotated around the drum-shaped deboning device 3 and thus are advanced towards and away from the supply conveyor 5. The discharge conveyor 7 may be generally positioned at a lower level than the supply conveyor 5 and the deboning units 11 are rotated away from the first conveyor 5, so as to discharge the deboned meat collected by the deboning units 11 onto the discharge conveyor 7. To allow for a convenient height level for the discharge conveyor 7, the supply conveyor 5, supported on legs 13, 15, 17 and 19, may be at a height that requires the operating person 9 to be positioned on a platform 21, supported by legs 23. For the rotation of the deboning units 11 in the deboning device or meat collecting device 3, an electric drive motor is housed in motor housing 25.

Figure 2:
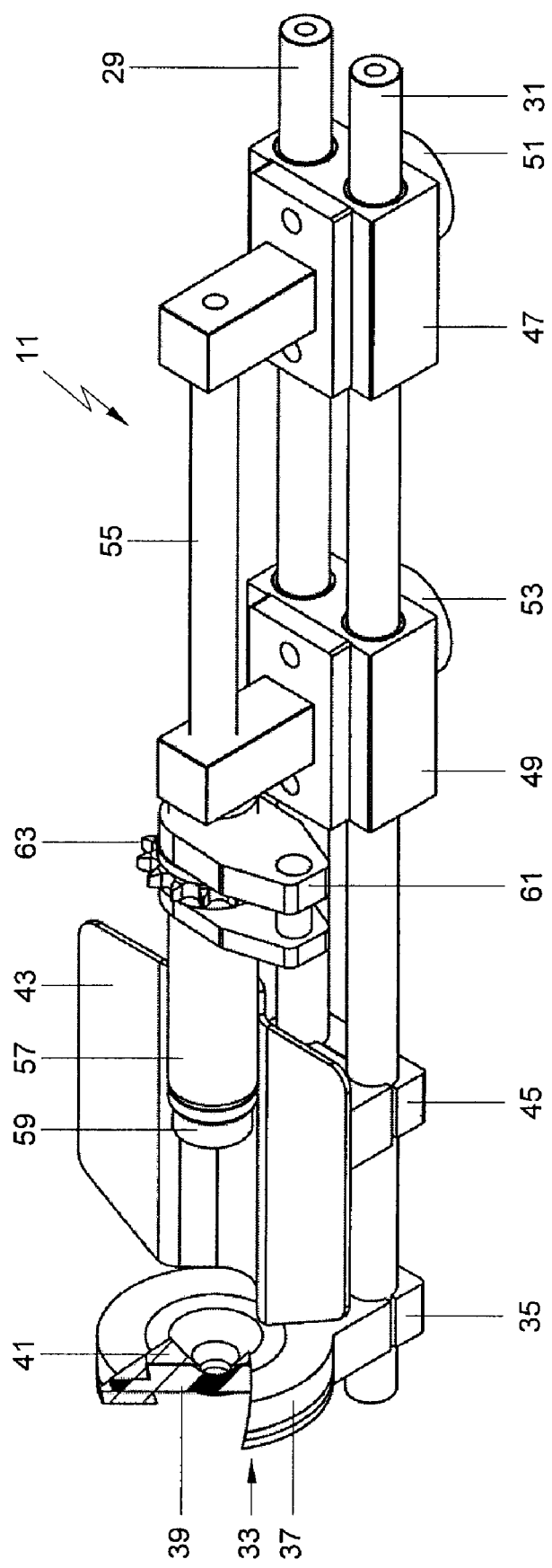
FIG. 2 is a perspective view illustrating a deboning unit for use in the apparatus of FIG. 1.

FIG. 2 illustrates an exemplary deboning unit 11, of which a plurality is provided in the deboning device 3 of FIG. 1. The deboning units 11 in the deboning device 3 may be arranged either on a rotating carrousel, or may revolve in a closed path defined by a conveyor chain as taught by U.S. Pat. No. 4,893,378 and U.S. Pat. No. 5,277,649. In the embodiment of FIGS. 1 and 2 a rotating carrousel of deboning units 11 has been shown as an illustrative example. The rotating carrousel carrying a plurality of deboning units 11 as illustrated in FIG. 1 has a geometric axis of rotation that coincides with a shaft 27, which is driven from the motor housing 25. The deboning unit 11 as shown in FIG. 2 comprises a pair of guiding rods 29, 31 by which the deboning unit can be mounted on a carrousel in a known manner. Generally, the guiding rods 29, 31 may be fixed at their ends to a frame of the carrousel so that each deboning unit is moved around the carrousel as it rotates.

Fixedly mounted on the pair of guiding rods 29, 31 at one end is a meat stripper diaphragm assembly 33 extending from a mounting block 35. The meat stripper diaphragm assembly 33 includes a mounting collar 37 for holding a rubber stripper disk 39 with a central orifice, and a nylon annular ring or anvil 41 providing a rigid cutting surface. The anvil 41 may be made of any suitable polyamide or other material. Also fixedly mounted on the pair of guiding rods 29, 31 is a supporting tray 43 secured to the guiding rods with a respective mounting block 45. Mounted for translating movement along the guiding rods 29, 31 are a first carriage 47 and a second carriage 49. The first carriage 47 has a first cam track follower wheel 51 rotatably attached thereto and the second carriage 49 has a second cam track follower wheel 53 rotatably attached, for purposes to be described below. Mounted on the first carriage 47 for translating movement toward and away from the meat stripper diaphragm assembly 33 is a bone pusher rod 55. The bone pusher rod 55 is concentrically engaged in and extends through a tubular knife 57. Tubular knife 57 is mounted for translating movement toward and away from the meat stripper diaphragm assembly 33 on the second carriage 49. The tubular knife 57 has a circumferential cutting edge 59 on its end and facing the meat stripper diaphragm assembly 33. The cutting edge 59 is sized and configured to engage the annular anvil 41 at the end of its travel toward the stripper diaphragm assembly. To enhance a cutting action of the cutting edge 59, the tubular knife 57 is also mounted for rotation about its longitudinal axis. To this end, the second carriage 49 carries a bearing block 61, which also locates a gear pinion 63 secured to the tubular knife 57 for rotatably driving the tubular knife upon rotation of the gear pinion 63.

Figure 3:
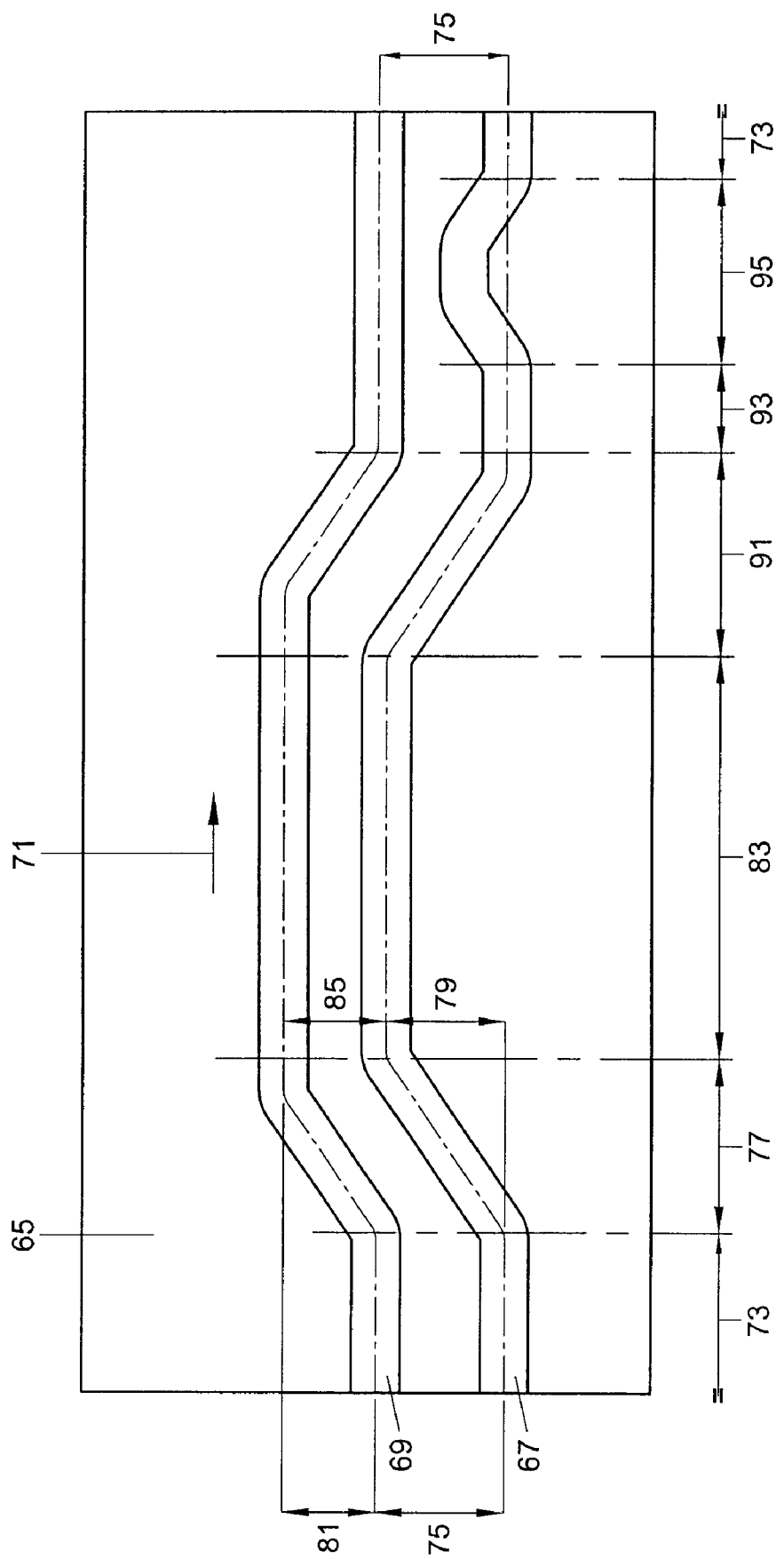
FIG. 3 shows a cam track configuration, which may extend around a drum, for controlling the deboning unit of FIG. 2.

A cam track section or body 65 is shown in FIG. 3. This cam track body 65 represents an unwound, flattened out circumferential surface of a drum, about which the carrousel of deboning units 11 rotates. As explained above, the cam track body 65 may also be employed in this flattened-out state when an array of deboning units 11 is moved through a closed path that includes a straight section moving past the cam track body. Reference is made again to the disclosures of U.S. Pat. No. 4,893,378 and U.S. Pat. No. 5,277,649, which are hereby incorporated by reference, as disclosing such an alternative arrangement, so that a further explanation here is superfluous. The cam track body 65 of FIG. 3 includes a first track 67, which may be a depressed groove formed in the body 65 for receiving and guiding the cam follower wheel 51 (FIG. 2) to move the bone pusher rod 55 along the guide rods 29, 31. The cam track body 65 further includes a second cam track 69 for moving the tubular knife 57 by means of its follower wheel 53, which engages with and rides in this second track. Relative movement of the deboning unit 11 shown in FIG. 2, with respect to the cam track body 65, is in accordance with arrow 71.

Figure 4:
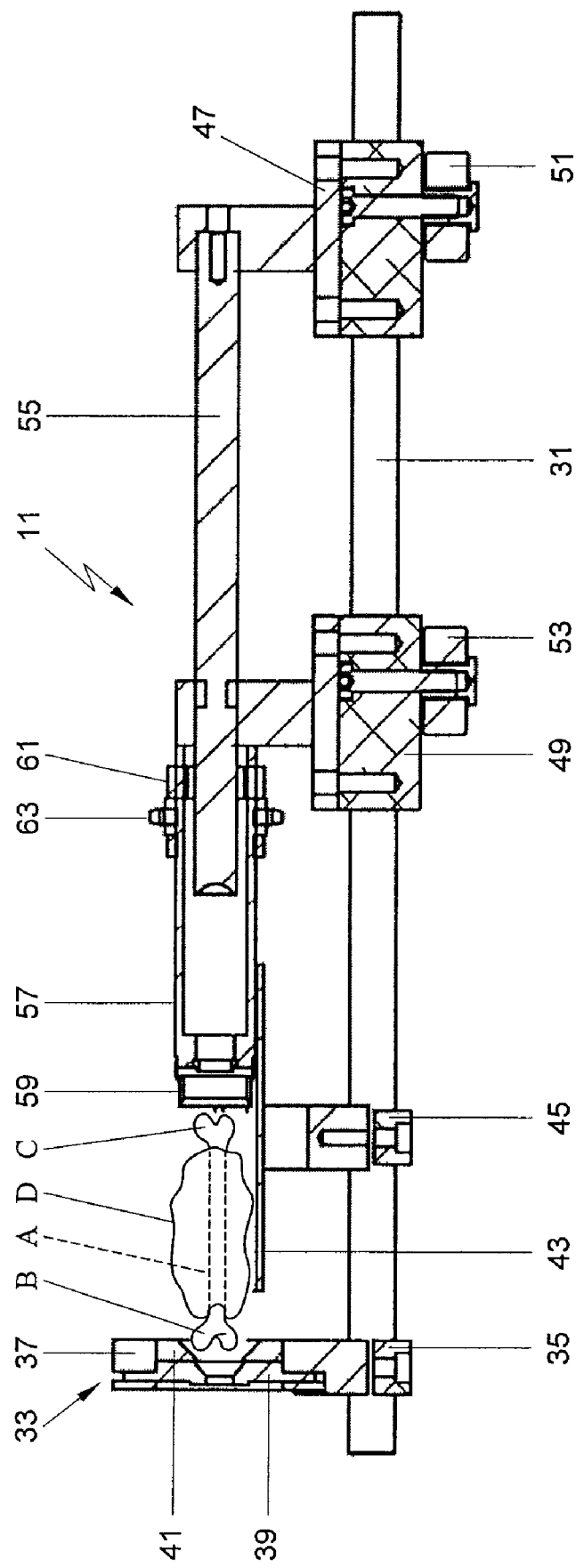
FIG. 4 is a longitudinal cross section of the deboning unit of FIG. 2 with an animal part in position aligned with the bone pusher, knife, and stripper disc prior to deboning.

For the further understanding of the cooperation between the first and second cam tracks 67, 69 and the deboning unit 11, reference will be made to FIG. 4 in conjunction with FIG. 3. The first and second cam tracks 67, 69 in a first section 73 are arranged to keep the deboning unit 11 at idle, i.e. with the pusher rod and circular knife retracted from the stripper diaphragm assembly, so that an animal part may be positioned on the supporting tray 43. The animal part, as shown in FIG. 4, has a bone A positioned with its opposite ends B, C between the stripper diaphragm assembly 33 and the tubular knife 57. The bone A still being surrounded by a sleeve of meat D to be removed. In this idle position of the deboning unit 11, the first and second tracks 67, 69 run in parallel to one another spaced by a first distance 75. The respective cam follower wheels 51 and 53 thus do not affect the positions of the pusher rod 55 or the circular knife 57. With the deboning unit 11 continuing to move relative to the cam track body 65 in accordance with the arrow 71, the cam tracks 67, 69, operating on the cam followers 51 and 53, start advancing both the bone pusher 55 and tubular knife 57 over a second section 77. In the orientation of the cam track body shown in FIG. 3, the bone pusher and tubular knife would be advanced toward the top of the page.

Figure 5:
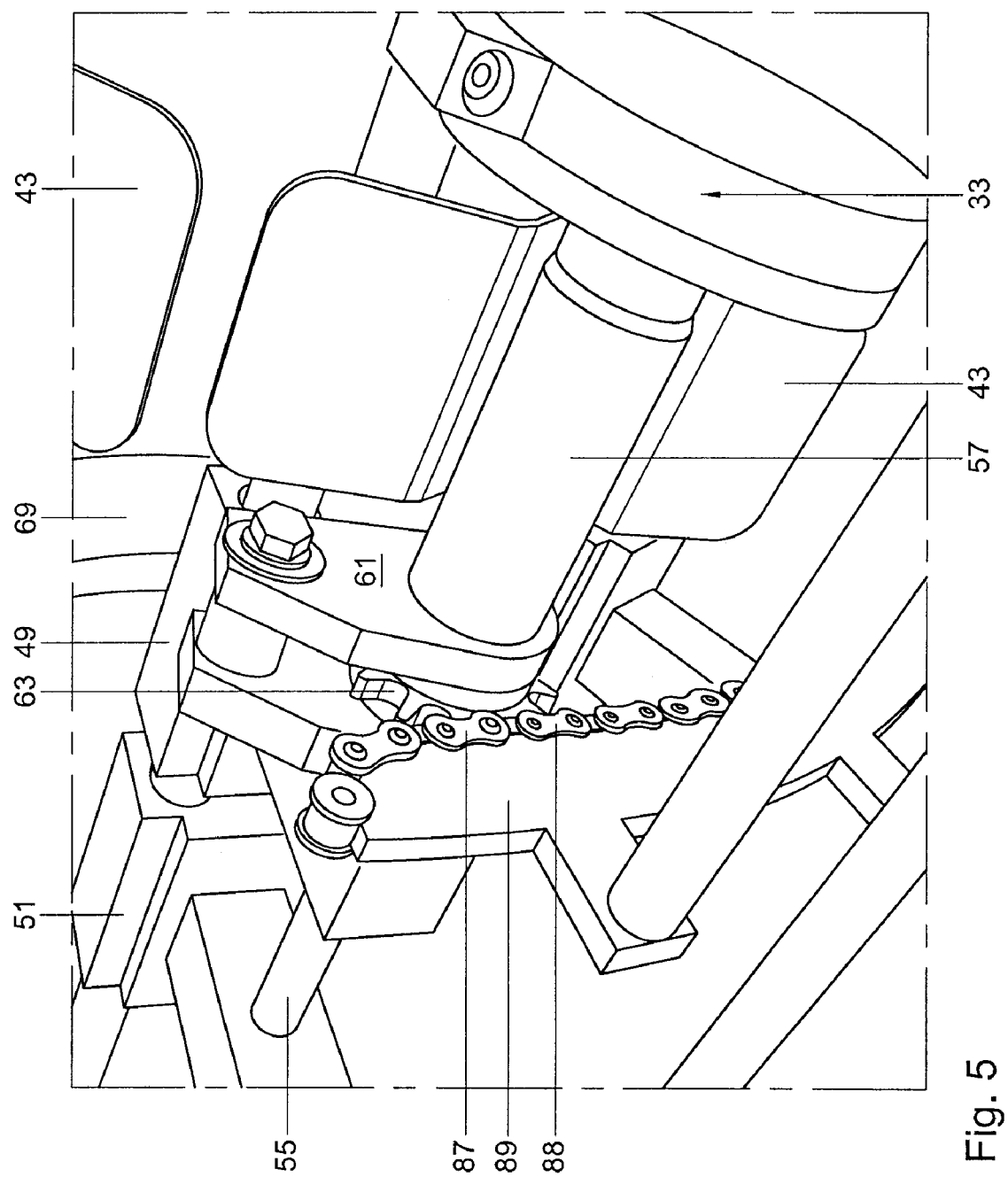
FIG. 5 is a perspective detail view of the deboning unit in a deboning device according to one embodiment of the invention.

The bone pusher 55 is advanced a second distance 79 by means of its follower wheel 51 riding in cam track 67. Simultaneously the tubular knife 57 is advanced a third distance 81, which is smaller than the second distance 79, by means of its cam follower wheel 53 riding in cam track 69. In a next, third, section 83 the first and second tracks 67, 69 run again parallel to one another, spaced at a fourth distance 85 slightly smaller than the first distance 75. This means that the bone pusher 55 is at its maximum advance, with its forward end spaced from but not in engagement with or extending through the stripper diaphragm 33. The tubular knife 57, in its most advanced position, touches the cutting surface provided on the nylon anvil 41 of the stripper diaphragm assembly 33 with its circumferential cutting edge 59. While the third track section 83 is engaging the deboner unit 11, the gear pinion 63 at the same time is brought into engagement with a toothed gear rack element 87, as shown in FIG. 5. This causes the tubular knife to rotate and thereby rotates its cutting edge 59 against the nylon anvil 41.

FIG. 5 is a detail in perspective of the deboning unit of the deboning device 3 of FIG. 1 illustrating better the rotation of the tubular knife 57. As the tubular knife approaches and reaches its maximum extension at section 83 of the cam track body 65, the gear pinion 63 located in the bearing block 61 engages a fixed toothed gear rack 87. The toothed gear rack 87 may be formed by fixing a length of roller chain 88 on a contoured roller chain support 89, but other techniques of creating a toothed gear rack also may be used. The gear pinion 63 thereby conveniently may be a roller chain pinion of standardized configuration. Having the gear rack configured like this allows easy adaptation to the path through which the deboning units 11 travel, be it in a straight path, a circular path or any other path that suits the layout of the apparatus. Alternatively it is also conceivable to employ a driven chain, looped over a contoured support, to replace the stationary gear rack. In this way the rotating speed of the tubular knife can be increased or reduced as necessary. The reference numerals inserted in FIG. 5 generally correspond to those of FIGS. 2 to 4. It is to be noticed though that the deboning unit 11 in FIG. 5 is viewed from a direction opposite to that of FIG. 2, i.e. generally from the direction of the stripper disc assembly 33.

Engagement of the gear pinion 63 with the toothed rack 87 rotates the tubular knife 57 and its circumferential cutting edge 59 and thereby the meat D is severed by the cutting edge 59 from around the bone end C, which may be a trailing knuckle. In a fourth cam track section 91 (FIG. 3) the gear pinion 63 has disengaged from the gear rack 87 and rotation of the tubular knife 57 is thus discontinued. The first and second cam tracks 67, 69 each move the bone pusher rod 55 and the tubular knife 57 back to their initial positions. For a short fifth cam track section 93, the bone pusher rod 55 and the tubular knife 57 are in their idle position. In this position of the deboner unit 11, the bone A has been pushed most of the way through the rubber disk 39 of the stripper diaphragm assembly 33, but is still retained in the rubber disc 39 by the bone end C, which together with the sleeve of meat D, is located on the opposite side of the stripper diaphragm assembly 33. Because the meat D has been cut lose from around the bone end C, the bone A can now be easily pulled or discharged from the stripper diaphragm assembly 33. Preferably, this is accomplished by an appropriate bone deflector disposed to engage the stripped portion of the bone protruding through the rubber stripper disc to catch the bone and pull or deflect it until it disengages from the rubber stripper disc and falls away. The engaging member or bone deflector is thus positioned in the path of movement of the bone portion protruding through the rubber disk 39. Such a bone deflector can additionally be associated with a chute for collecting the bones separated from the meat. The meat D, now boneless, can be discharged from the supporting tray 43. As is shown in FIG. 1, the deboning unit 11 eventually progresses to an upside-down position above the second conveyor 7, which collects the meat falling from the deboning device 3 by gravity or other suitable means with which the skilled artisan will be familiar.

In a sixth cam track section 95 the bone pusher 55 is shortly advanced within the tubular knife 57 to ensure that any meat remnants that may have become lodged between the bone pusher and the tubular knife are discharged. The cam track body 65 subsequently returns the bone pusher rod 55 to its idle position and the deboning unit 11 is thereby positioned and ready for another cycle. This action is preferably timed to take place simultaneous with collection of the meat onto the discharge conveyor 7.

Hence disclosed is a method, apparatus, and device for mechanically collecting meat from animal parts having an elongated bone A extending through a sleeve of meat D. The device includes at least one deboning unit 11 with a supporting tray 43 for supporting one of the animal parts, a stripper diaphragm assembly 33 on one end of the supporting tray 43 and a movable bone pusher rod 55 and a movable tubular knife 57 on an opposite end of the supporting tray 43. The bone pusher rod 55 and the tubular knife 57 are arranged concentrically with respect to one another. A control mechanism 51, 53, 65, 67, 69 is provided for advancing and retracting the bone pusher rod 55 and the tubular knife 57 between a first position, allowing loading of the animal part, and a second position, in which the meat is collected against the stripper diaphragm 33 and the bone A is pushed only partly through the rubber disk 39 of the diaphragm assembly 33. The control mechanism for advancing and retracting 51, 53, 65, 67, 69 is adapted to move the bone pusher rod 55 over a first distance 79 and the tubular knife over another second distance 81 smaller than the first distance 79, so as not to extend the bone pusher through the rubber disk 39 of the diaphragm 33. A knife rotating mechanism 63, 87 can rotate the tubular knife 57 upon engagement with the diaphragm 33 for severing the meat D from around a trailing one of opposite ends B, C of the elongated bone A. An engaging member for engaging a leading bone portion partly protruding through the diaphragm 33 pulls and/or otherwise releases the bone A completely from the rubber disk 39 of the stripper diaphragm 33.

One aspect of the apparatus for mechanically collecting meat from animal parts, as described in reference to FIGS. 1 to 5, is a supporting tray 43 that is part of the deboning unit 11. As a consequence, the supporting tray 43 rotates in the carrousel together with the deboning units 11 and the area available to the operating person 9, as shown in FIG. 1, for positioning of animal parts might be considered by some to be confined. Moreover the operating speed of the apparatus is not only dictated by the rotational speed of the carrousel, but also by the area available for manual loading.

Figure 6:
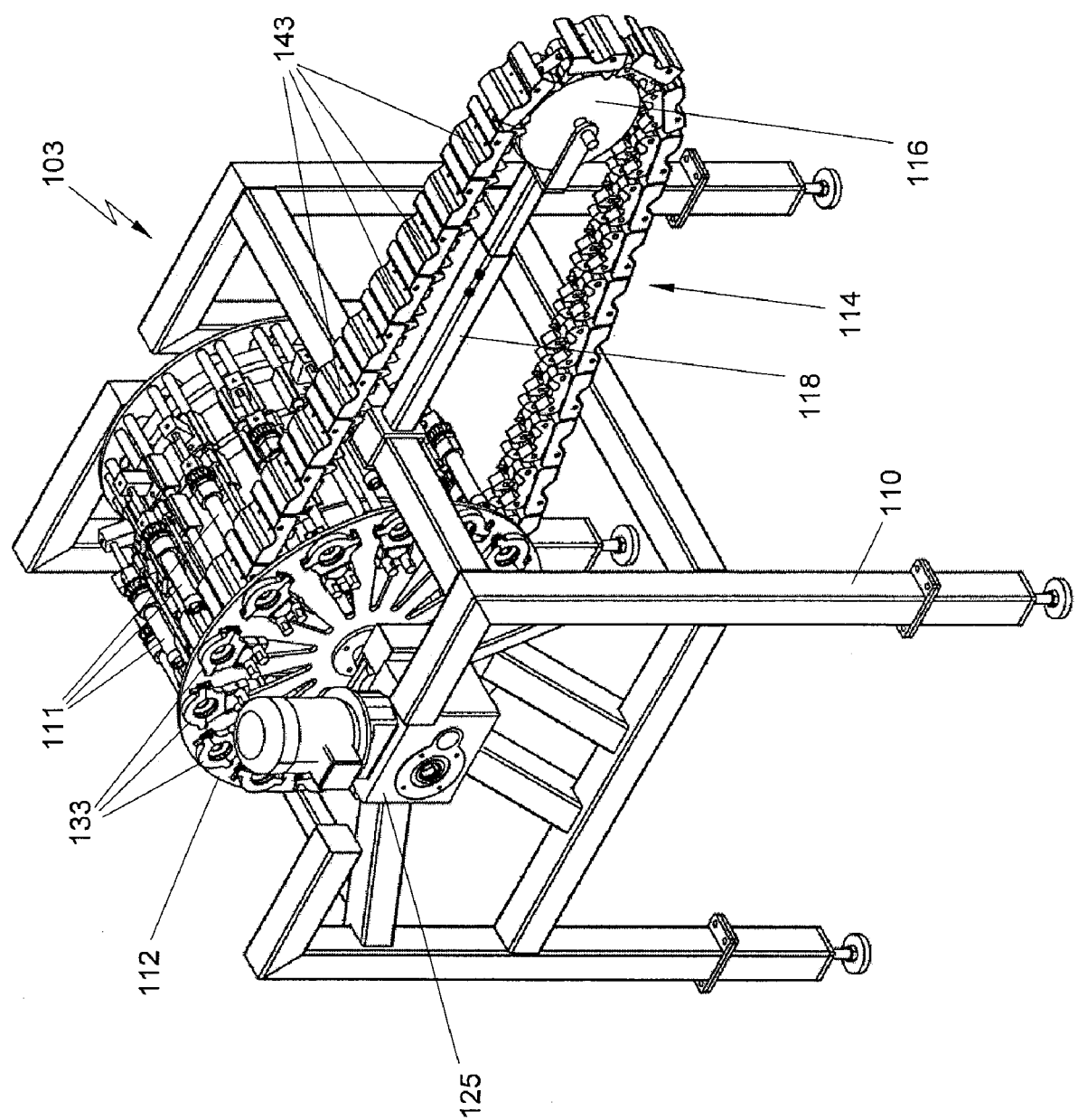
FIG. 6 shows a variation of a device for mechanically removing meat from animal parts in accordance with and embodiment the invention.

Thus, a further embodiment of the invention which will now be explained in reference to FIGS. 6 through 9 that provides for an extended loading area for manually positioning the animal parts. The reference numerals used in FIGS. 6 to 9 generally differ a full "100" from those used in reference to FIGS. 1 to 5, when used to identify elements that are similar or function in a similar way. FIG. 6 shows a deboning apparatus 103 for mechanically removing meat from an elongate animal bone. The apparatus 103, for clarity, is shown without any protective covers and includes a frame 110. A plurality of deboning units 111 is arranged about the outer circumference of a carrousel 112.

A plurality of supporting trays 143, which are separate from the deboning units 111, are arranged in an endless conveyor loop 114. The endless conveyor loop 114 extends somewhat like a chain about part of the circumference of the carrousel 112 and around a return pulley 116 on a frame outrigger 118. An inner surface of the endless conveyer loop 114 carries tooth formations to engage complementary elements associated with the deboning units 111 at the outer circumference of the carrousel 112. The carrousel 112 is driven by an electric motor unit 125. Meat stripper disks 133 are arranged about the carrousel 112 to register or align with the positions of the deboning units 111.

Figure 7:
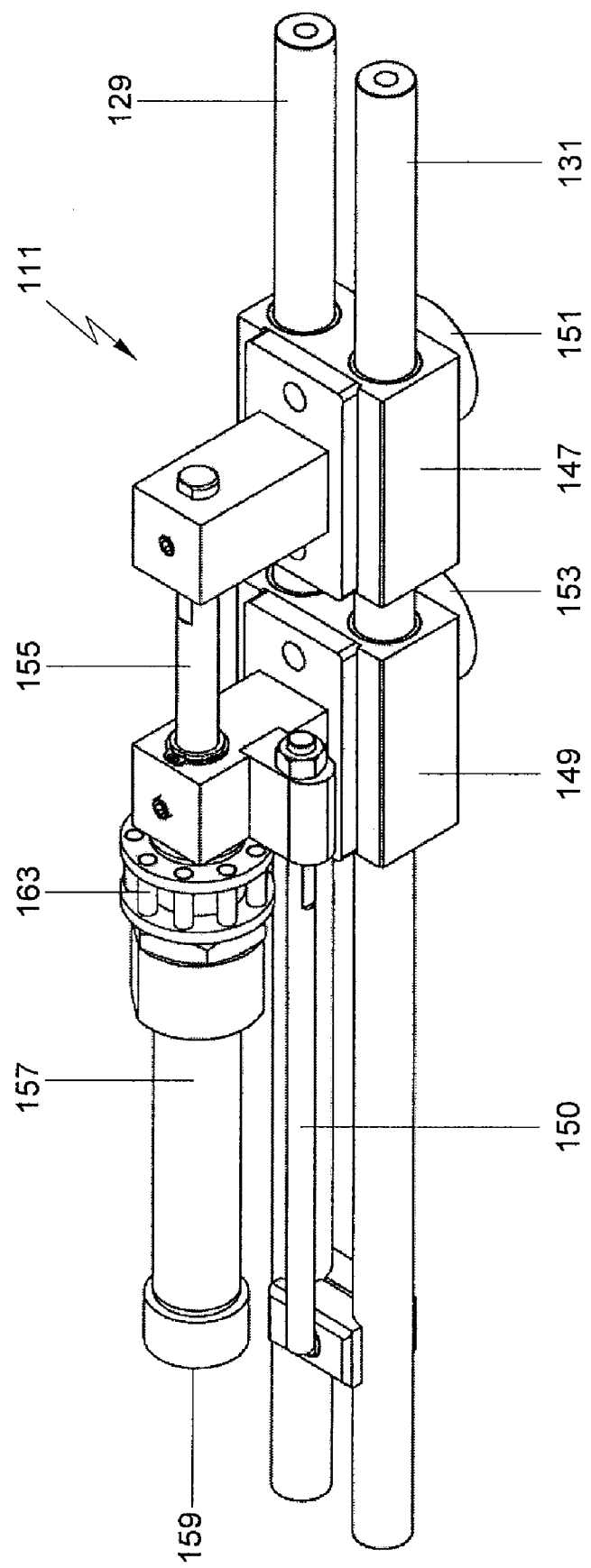
FIG. 7 is a perspective view somewhat similar to FIG. 2 of a deboning unit for use in the device of FIG. 6.

FIG. 7 illustrates one of the deboning units 111 from the carrousel of the apparatus of FIG. 6. The deboning unit 111 comprises a pair of guiding rods 129, 131. A first carriage 147 is mounted for translational movement along the guiding rods 129 and carries a bone pusher 155 and a first cam track follower wheel 151 for advancing and retracting the bone pusher 155. When the deboning unit rotates with the carrousel 112, the first cam track follower wheel 151 engages with a first cam track on a stationary cam track drum within the carrousel 112. Such a non-rotating cam track drum can have an outer circumferential surface identical to the cam track body 65 as already described in reference to FIG. 3. Thus, the same description is valid as for the second embodiment of FIGS. 6 to 9; and need not be repeated here.

A second carriage 149 rotatably carries a tubular knife 157. The second carriage 149 with the tubular knife 157 is moved in relation to the guiding rods 129, 131 by a second cam follower wheel 153. The second cam follower wheel 153 is engaged in a second cam track (reference number 69 in FIG. 3) to reciprocate the tubular knife 157 through an operating cycle about the stationary cam track drum of the carrousel 112. The tubular knife 157 has a circumferential cutting edge 159 that can be rotated for cutting by a pinion 163. The pinion 163 is somewhat different than the pinion gear of the deboning unit shown in FIG. 3 and requires an adapted complementary gear rack or segment for its driving. The precise configuration of such a gear rack may vary, but generally includes teeth or protrusions configured to engage with the circumferential spaces defined in the pinion 163. Also mounted on the second carriage 149 is a rod 150 that extends parallel to the tubular knife 157. The rod 150 assists in keeping the sleeve of meat not supported by the relevant supporting tray 143 of the endless conveyor loop 114 during the deboning operation, from being undesirably rotated by the rotating tubular knife 157.

Figure 8:
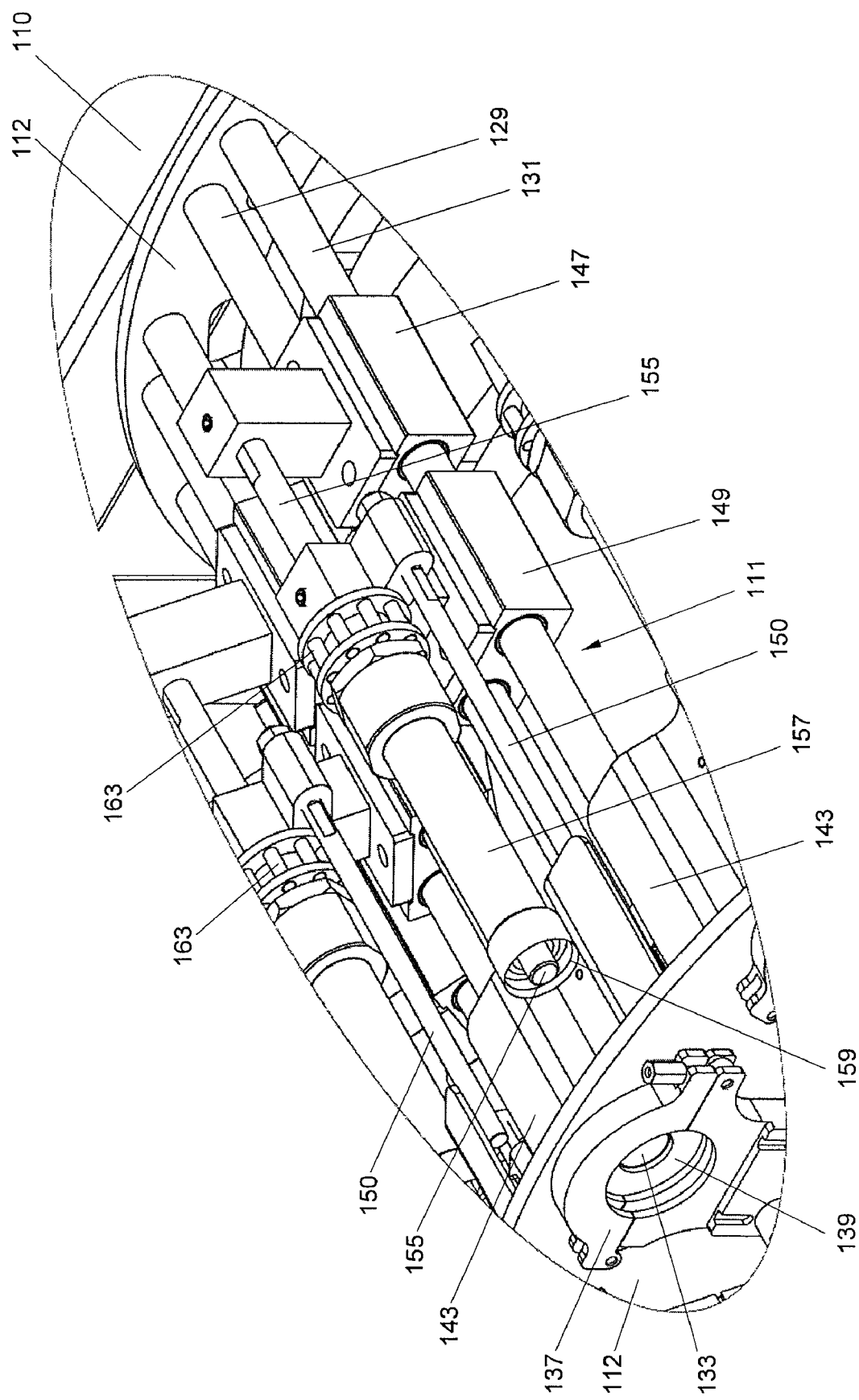
FIG. 8 is a detailed perspective view of a circumferential portion of a carrousel that may be used in the device of FIG. 6.

FIG. 8 shows a detail of an outer circumferential portion of the carrousel 112 with the deboning units 111 of FIG. 7 in operative positions. The detail of FIG. 8 is taken in the area of the carrousel's circumference where the supporting trays 143 are in operative engagement with the relevant deboning units 111. Supporting trays 143 have been brought into alignment between a relevant one of the deboning units 111 and the corresponding stripper disc assembly 133, and at a location of the stationary cam drum where both the bone pusher 155 and the tubular knife 157 are in their most retracted or idle positions with respect to the stripper disks 133. This corresponds to the idle cam track section 73 as illustrated in FIG. 3. The meat stripper disk assembly 133 is mounted in a mounting collar 137 on the carrousel 112 and includes a rubber disk 139. The remainder of the reference numerals indicated in FIG. 8 has already been described in reference to the previous Figures. While for clarity, no animal parts are shown on the trays 143 in FIG. 8, it should be understood that in normal operation of the apparatus 103 of this second embodiment, the trays 143 are already loaded with respective animal parts, such as poultry thighs, before they are engaged by a deboning unit 111.

A particular advantage of the apparatus of FIGS. 6 to 9 is that the area for loading has been substantially enlarged by the endless conveyor loop 114 extending beyond the boundaries of the carrousel 112. This not only enables the trays 143 to be loaded by more than a single operating person, if needed, but also provides and environment where loading can take place in a safer way. Because loading can be accomplished a less awkwardly and cumbersome manner, it becomes possible to raise the operation speed of the apparatus 103, and thus increasing throughput, by raising the rotational speed of the motor unit 125 (see FIG. 6).

Figure 9:
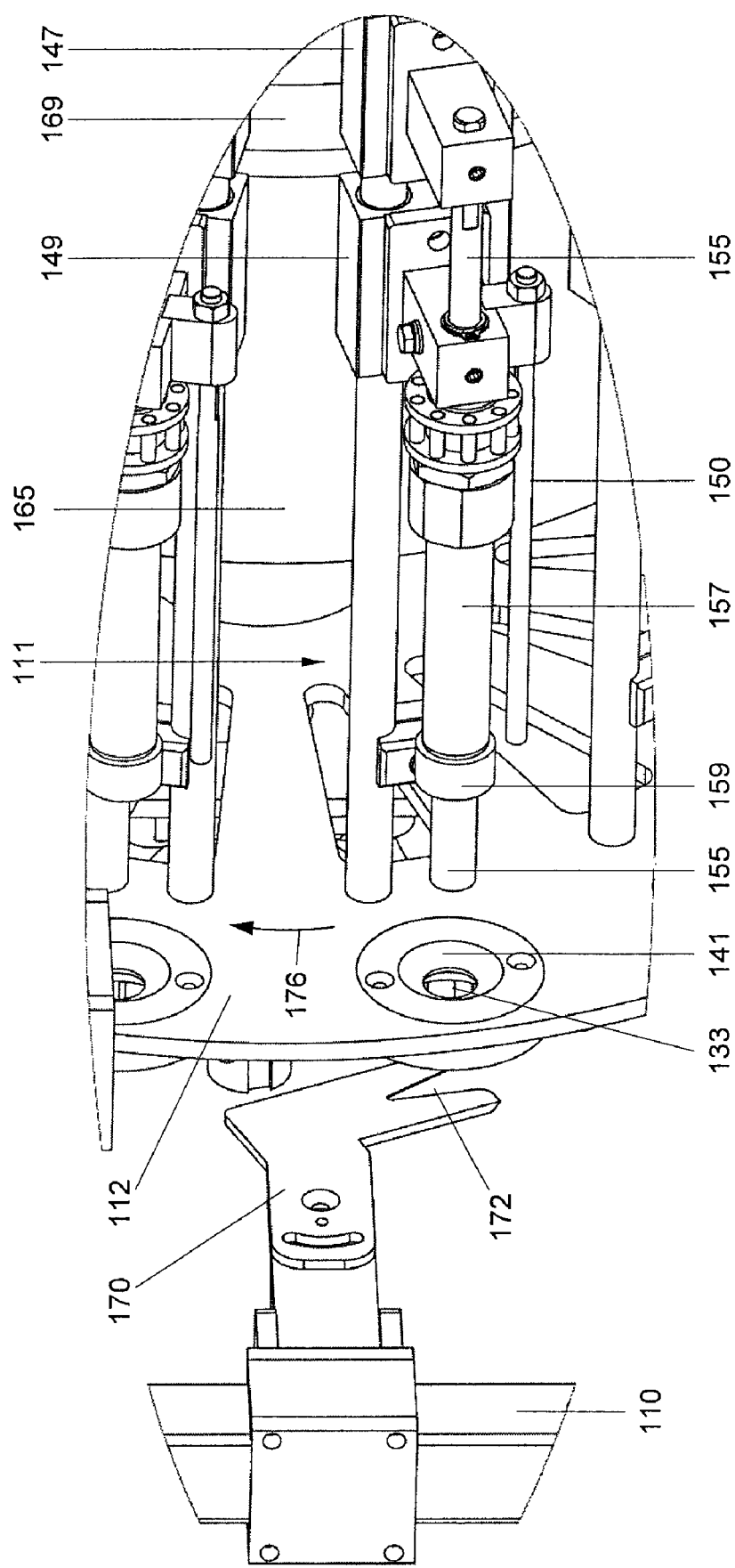
FIG. 9 is another perspective circumferential view of a carrousel that may be used in the device of FIG. 6.

FIG. 9 shows a further detail of the carrousel 112 at a portion of its circumference where it meets a bone deflector 170. For clarity, the supporting trays have been omitted in this drawing, although these would still be in position in relation to the deboning units 111 in this position of the carrousel 112. As seen in FIG. 9, a bone deflector 170 is mounted in a stationary position on the machine frame 110. The bone deflector 170 has a V-shaped slot 172 for engaging a bone portion protruding from the meat stripper diaphragm assembly 133, when the carrousel 112 rotates in the direction of arrow 176 past the bone deflector 170. A pulling force on the bone is exerted when a knuckle at a leading end of the protruding bone portion is caught behind the V-shaped slot 172 of the bone deflector 170, and the carrousel 112 is rotated further in the direction of arrow 176. This will eventually "pull" the bone from the stripper disk assembly 133 and specifically will pull the trailing end of the bone that was still partially held by the rubber disc, through the disc to dislodge the bone. Once released from the meat stripper assembly 133, the bone will drop from the bone deflector 170 simply under the influence of gravity and can be collected separately from the meat, which remains on the other side of the meat stripper assembly 133. Further shown in FIG. 9 is a portion of the stationary cam drum, as referenced by numeral 165, and a portion of its second cam track 169 for advancing and retracting the tubular knife 157. Finally FIG. 9 illustrates perhaps better the nylon or polyamide ring 141 that overlies the peripheral portion of the rubber disk of the meat stripper assembly 133 to provide a cutting surface or anvil for the circumferential cutting edge 159 of the tubular knife 157.

Figure 10:
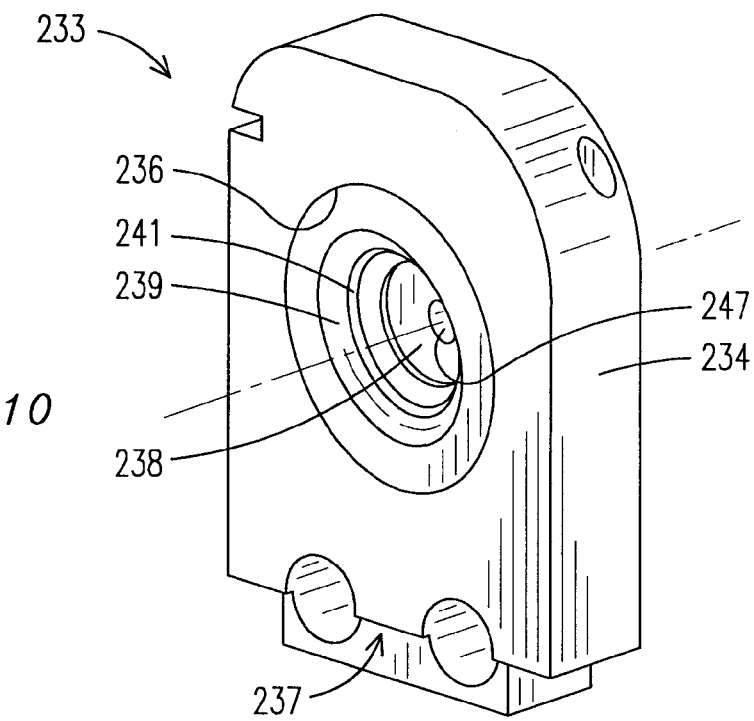
FIG. 10 is a perspective view of a stripper disc assembly according to one preferred embodiment.
Figure 11:
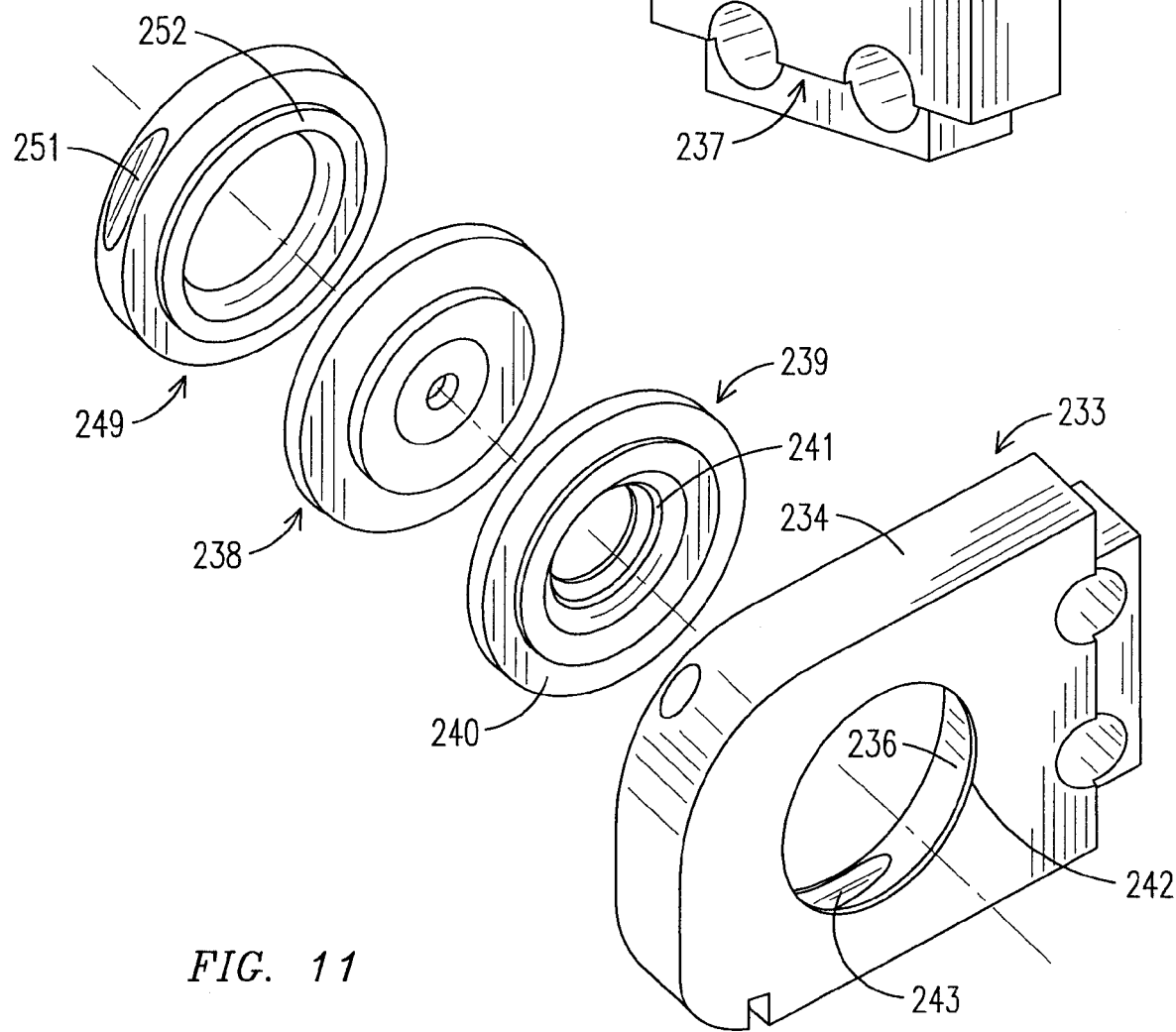
FIG. 11 is an exploded perspective view of the stripper disc assembly of FIG. 10 seen from a first viewing angle.
Figure 12:
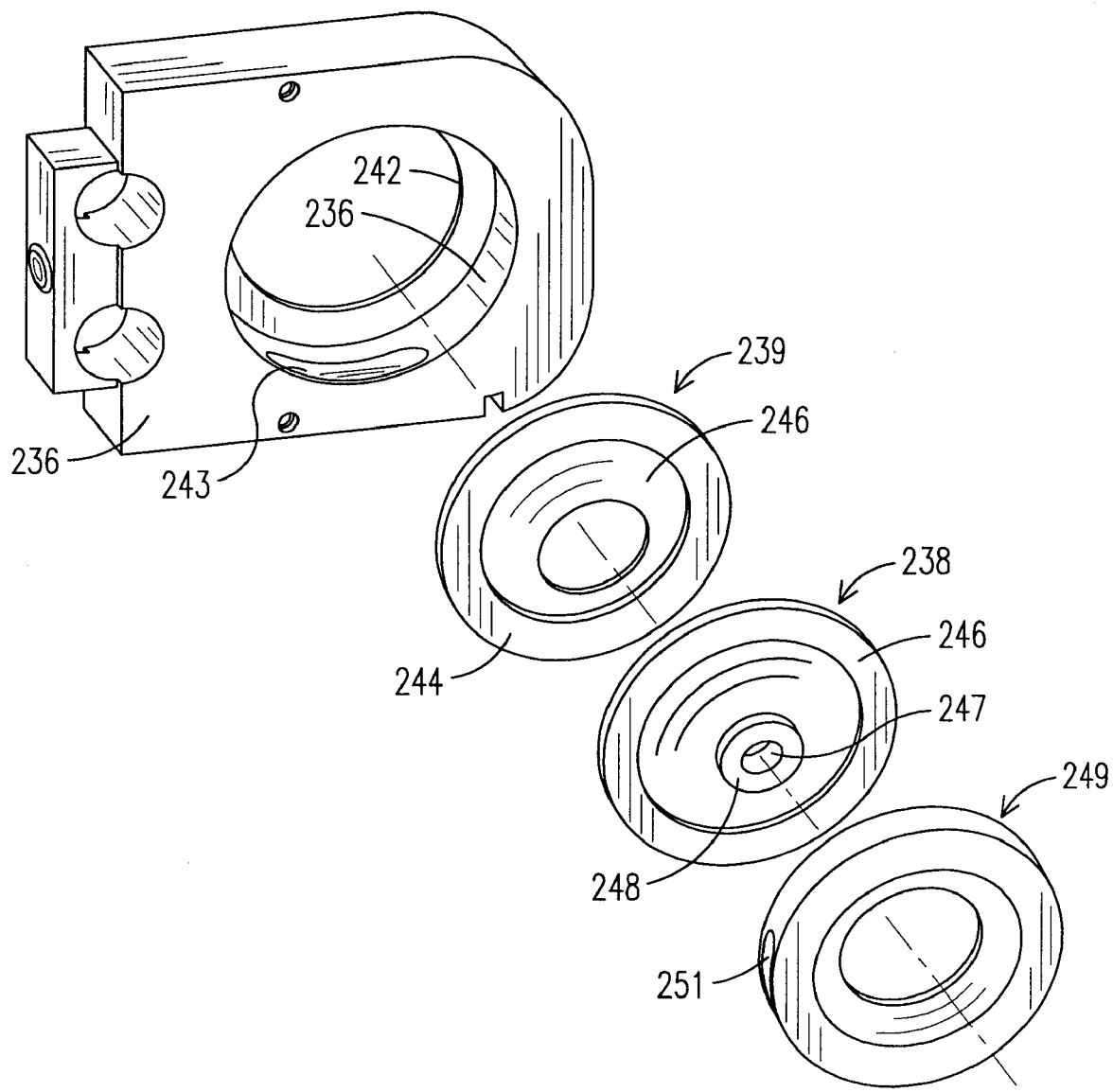
FIG. 12 is an exploded perspective view of the stripper disc assembly of FIG. 10 seen from a second viewing angle.

FIGS. 10 through 12 illustrate the details of a stripper disc assembly or meat stripper assembly according to an embodiment of the invention. In FIG. 10, the stripper disc assembly 233 is seen from the side that faces a corresponding tray of a deboning unit. The assembly 233 comprises a frame 234, made of metal in this case, having a circular opening 236. The frame is formed with a clamp structure 237 with which the stripper disc assembly can be fixedly secured to the guiding rods 29, 31 of a deboning unit 11 (FIG. 2). A flexible rubberized stripper disc 238 is secured within the opening 236 of the frame 234 as described in more detail below and is formed with a central opening 247 through which bones are pushed to strip meat from the bones. An annular anvil 239 is mounted in the opening 236 adjacent to the stripper disc 238 and surrounding its central opening 247 as shown. The anvil 239 may be made of any appropriate relatively hard resilient material such as nylon or other food-safe polymeric or other type of material. The anvil 239 has a sloped wall that tapers inwardly to a circular knife end engaging surface 241 against which the circumferential cutting edge 59 of the tubular knife 57 resides when the tubular knife is in its fully extended position, as described above.

FIG. 11 is an exploded view of the stripper disc assembly 233 illustrating details of its various components perhaps more clearly. The central opening 236 of the frame 234 is seen to be formed with a lip or rim 242 at one end. A pair of cam lock mechanisms 243 (only one of which is visible in FIG. 11) extends partially into the opening for securing other elements within the opening. More specifically, each cam lock is a rod shaped metal member disposed in a bore such that a part of the surface of the rod projects into the central opening 236. At least one of the rod-shaped metal members has a flattened portion on one side such that when rotated to present the flattened portion toward the central opening 236, the metal member does not project into the central opening. This is the unlocked condition of the cam lock mechanism. Arcuate indentations 251 are formed at opposing sides of a locking ring 249 for receiving the projecting portions of the rod-shaped metal members to secure the locking ring 249 in place within the central opening 236.

With at least one of the cam lock mechanisms in its unlocked condition, the anvil 239 can be slipped into the central opening 236 of the frame 234 and rest against the lip 242 formed on the other end of the opening. For this purpose, an annular depression 240 is formed around the perimeter of the anvil 239 to receive the lip 242. Once the anvil 239 is in place within the central opening 236, the rubber or rubberized stripper disc 238 is inserted into the central opening until it rests against the anvil 239. Finally, the locking ring 249 can be slipped into the central opening 236 behind the stripper disc 238 with its arcuate indentations 251 aligned with the cam lock mechanisms 243, at least one of which is in its unlocked condition. The rod-shaped metal member of the unlocked cam lock mechanism is then rotated with an appropriate tool until its non-flattened circular side moves into the adjacent arcuate indentation of the locking ring 249 to secure the ring in place capturing the anvil 239 and the stripper disc 238 within the opening. As the rod-shaped metal member is rotated into the indentation, it pulls the locking ring tightly into the opening of the frame 234. An annular protrusion 252 formed on the locking ring is thus pressed tightly against the stripper disc 238. This, in turn, causes the stripper disc 238 to deform and bulge outwardly through the opening of the locking ring. This configuration of the stripper disc, which previously may have been accomplished by squeezing radially inwardly on the stripper disc, has been found advantageous for stripping meat from animal bones, and particularly for deboning poultry thighs.

FIG. 12 shows the exploded stripper disc assembly from the opposite angle and illustrates better the cam lock mechanisms 243 of the frame 234. The cam lock mechanism on the bottom in this figure is seen to be in its unlocked condition with the flat side of its rod-shaped metal member rotated to face the interior of the central opening 236 of the frame 234. From this perspective, the anvil 239 is seen to be formed with a frustro-conical indentation around its central opening. It is into this indentation that the protruding rim 252 of the locking ring pushes the rubber stripper disc when the locking ring is locked into place to accomplish the outward bulge of the stripper disc mentioned above. It will thus be seen that the stripper disc assembly 233 of the present invention is easy to disassemble and clean, simple and easy to maintain with replacement parts, and accomplishes the desirable budge of the stripper disc without placing the disc under radial stress, which can sometime lead to the stripper disc popping out of its frame in use. Further, the anvil 239 presents a hardened cutting surface 241 to the circumferential cutting edge 59 of the tubular knife 57 so that meat is efficiently severed from around the trailing end of a bone before the bone is pulled on through the stripper disc.

It is thus believed that the operation and construction of the present invention will be apparent from the foregoing description and accompanying drawing figures. The invention is not limited to any embodiment herein described and, within the purview of the skilled artisan; modifications are possible which should be considered within the scope of the invention. Equally, all kinematic inversions are considered inherently disclosed and to be within the scope of the present invention. In the claims, any reference signs shall not be construed as limiting the claim. The term 'comprising' when used in this description or the appended claims should not be construed in an exclusive or exhaustive sense but rather in an inclusive sense. Thus the expression 'comprising' as used herein does not exclude the presence of other elements or steps than those listed in a claim. Furthermore, the words 'a' and 'an' shall not be construed as limited to 'only one,' but instead are used to mean 'at least one,' and do not exclude a plurality. The mere fact that certain measures are recited in mutually different claims does not indicate that a combination of these measures cannot be used to advantage. Expressions such as: "means for . . . " should be read as: "component configured for . . . " or "member constructed to . . . " and should be construed to include equivalents for the structures disclosed. The use of expressions like: "critical," "preferred," "especially preferred," etc. are not intended to limit the invention. Features that are not specifically or explicitly described or claimed may be additionally included in the structure according to the present invention without deviating from its scope. These and other additions, deletions, and modifications might well be made to the exemplary embodiments presented and described herein without departing from the spirit and scope of the invention as set forth in the claims.

What is claimed is:

1. An apparatus for collecting meat from animal parts that have an elongated bone with opposite longitudinal ends that extends through a sleeve of meat, the apparatus comprising:
   a deboning unit including a meat stripper diaphragm and an elongated bone pusher having an end facing the meat stripper diaphragm;
   an elongated tubular knife concentrically surrounding the bone pusher and having a sharpened cutting end facing the meat stripper diaphragm;
   a holder for positioning an animal part between the bone pusher and the meat stripper diaphragm, the holder orienting the bone of the animal part with one longitudinal end in substantial alignment with the bone pusher and the tubular knife and with the other longitudinal end in substantial alignment with the meat stripper diaphragm;
   a first drive mechanism for relatively moving the bone pusher and the meat stripper diaphragm towards and away from one another over a first distance to push the bone of an animal part partially through the meat stripper diaphragm;
   a second drive mechanism for relatively moving the tubular knife and the meat stripper diaphragm towards and away from one another simultaneously with the bone pusher over a second distance to move the cutting end of the tubular knife toward engagement with the meat stripper diaphragm;
   a rotating drive mechanism for selectively rotating the tubular knife to sever meat from around the portion of the bone not pushed through the meat stripper diaphragm; and
   a bone deflector for engaging the bone portion partially extending through the diaphragm to release the bone completely from the diaphragm.

2. An apparatus as claimed in claim 1, and wherein the holder comprises at least one supporting tray for supporting the animal part and wherein the deboning unit is adapted to engage the supporting tray.

3. An apparatus as claimed in claim 2, wherein the drive mechanisms for moving the bone pusher and the meat stripper diaphragm relative to one another and the tubular knife and the meat stripper diaphragm relative to one another comprise a mechanism for advancing and retracting the bone pusher and the tubular knife between a first position, allowing engagement between the at least one supporting tray and the deboning unit, and a second position, in which the meat of an animal part when supported on the supporting tray is collected against the meat stripper diaphragm and the bone is pushed only partly through the diaphragm, the mechanism for advancing and retracting is adapted to move the bone pusher over the first distance and the tubular knife over the second distance.

4. An apparatus as claimed in claim 3, wherein the mechanism for advancing
   and retracting includes a first cam track for moving the bone pusher and a second cam track for moving the tubular knife.

5. An apparatus as claimed in claim 4, wherein the bone pusher is mounted to a first carriage having a first cam follower wheel engaging the first cam track to advance and retract the bone pusher.

6. An apparatus as claimed in claim 5, wherein the tubular knife is mounted to a second carriage having a second cam follower engaging the second cam track to advance and retract the tubular knife.

7. An apparatus as claimed in claim 5 and 6, wherein the first and second carriages are guided for sliding movement along a pair of first and second guiding rods.

8. An apparatus as claimed in one of claim 7, wherein the first and second cam tracks and the deboning unit are relatively movable with respect to one another for advancing and retracting the deboning unit.

9. An apparatus as claimed in claim 8, wherein the first and second cam tracks are in a stationary position and the deboning unit is arranged for movement in a path extending along the cam tracks.

10. An apparatus as claimed in claim 9, wherein the first and second cam tracks are on a periphery of a stationary drum around which the deboning unit, or plurality of deboning units, is arranged to move as a carrousel.

11. An apparatus as claimed in claim 10 and further comprising a gear pinion associated and rotatable with the rotary knife and wherein the rotating drive mechanism further includes a toothed element for engaging the gear pinion, and wherein the toothed element is an arcuate segment associated with the periphery of the stationary drum.

12. An apparatus for mechanically collecting meat from animal parts as claimed in claim 10, wherein the stationary drum of the device is positioned with its geometric axis in a horizontal orientation and parallel to a longitudinally extending discharge conveyer, onto which the collected meat is discharged.

13. An apparatus as claimed in claim 12, further including a supply conveyer extending parallel to the geometric axis of the stationary drum, from which supply conveyor the revolving deboning units can be loaded in a radial direction with respect to the stationary drum.

14. An apparatus as claimed in claim 2, wherein the at least one supporting tray and the deboning unit are adapted to engage one another with the stripper diaphragm being on one end of the supporting tray and the bone pusher and tubular knife both being on an opposite end of the supporting tray.

15. An apparatus as claimed in claim 2, wherein the at least one supporting tray is part of a plurality of supporting trays, and the deboning unit is part of a plurality of deboning units.

16. An apparatus as claimed in claim 15, wherein the plurality of supporting
   trays is greater than the plurality of deboning units.

17. An apparatus as claimed in claim 16, wherein the plurality of supporting trays are mounted for movement through a first path, and the plurality of deboning units are mounted for movement through a second path.

18. An apparatus as claimed in any one of claims 16, wherein each supporting tray is arranged on an endless conveyor loop.

19. An apparatus as claimed in any one of claims 16, wherein the first and second paths are identical, wherein the plurality of supporting trays, in number, equals the plurality of deboning units, and wherein the supporting tray is part of the deboning unit.

20. An apparatus as claimed in claim 1 and wherein the meat stripper diaphragm is adapted to confront the bone pusher and the tubular knife.

21. An apparatus as claimed in claim 1 and wherein the tubular knife is arranged for severing the meat from around a trailing one of opposite ends of the elongated bone.

22. An apparatus as claimed in any one of claims 1, wherein the deboning unit is arranged on a carrousel.

23. An apparatus as claimed in claim 22, wherein the carrousel is mounted for rotation.

24. An apparatus as claimed in claim 23, wherein each supporting tray is arranged on an endless conveyor loop and wherein the endless conveyor loop is driven by the carrousel.

25. An apparatus as claimed in claim 24, wherein each supporting tray is adapted to be engaged by a relevant one of each deboning unit, for at least part of its movement.

26. An apparatus as claimed in claim 1, wherein the meat stripper diaphragm is part of the deboning unit.

27. An apparatus as claimed in claim 1, wherein the tubular knife has a circumferential cutting edge at its end.

28. An apparatus as claimed in claim 1, wherein the rotating drive mechanism for the tubular knife includes a gear pinion on an end of the tubular knife spaced from the circumferential cutting edge.

29. An apparatus as claimed in claim 28, wherein the rotating mechanism further includes a toothed element for engaging the gear pinion.

30. An apparatus as claimed in claim 29, wherein the toothed element is a stationary toothed rack.

31. An apparatus as claimed in claim 30, wherein the gear pinion is a chain pinion and wherein the toothed element is part of a chain.

32. An apparatus as claimed in claim 31, wherein the part of the chain is held stationary on a chain support.

33. An apparatus as claimed in one of claims 29, wherein the toothed element is positioned in a path of movement through which the or each deboning unit is adapted to be moved.

34. An apparatus as claimed in claim 1, wherein the bone deflector is positioned in a path of movement through which each deboning unit is adapted to be moved.

35. An apparatus as claimed in claim 1, wherein the meat stripping diaphragm comprises a rubber or elastomeric disk, having a central aperture, which is replaceably held in a mounting collar.

36. An apparatus as claimed in claim 1, wherein a side of the stripping diaphragm facing the tubular knife includes a relatively rigid annular cutting surface, arranged for engagement by the cutting edge of the tubular knife.

37. A method of collecting meat from animal parts that have an elongated bone with opposite longitudinal ends extending through a sleeve of meat, the method comprising the steps of:
(a) positioning one of the animal parts for engagement by a deboning unit having a bone pusher and a tubular knife, arranged concentrically thereabout, and aligning the bone of the animal part with one longitudinal end in alignment with the bone pusher and the tubular knife;
(b) providing a meat stripper diaphragm proximate to an opposite longitudinal end of the bone;
(c) relatively moving the bone pusher and the meat stripper diaphragm towards one another over a first distance and simultaneously moving the tubular knife and the meat stripper diaphragm towards one another over a second distance that is smaller than the first distance, and thereby pushing the bone partially through the diaphragm;
(d) rotating the tubular knife as it moves toward engagement with the diaphragm and severing the meat from around a trailing one of opposite ends of the elongated bone;
(e) relatively moving the bone pusher and the meat stripper diaphragm away from one another and simultaneously moving the tubular knife and meat stripper diaphragm away from one another; and
(f) pulling the bone completely through the diaphragm.

38. The method of claim 37 and further comprising the step of discharging the collected meat onto a conveyor.

39. The method of claim 37 further comprising providing a supporting tray and loading one of the animal parts onto the supporting tray prior to positioning the animal part and the supporting tray for engagement by the deboning unit between the bone pusher and the meat stripper diaphragm.

40. The method of claim 37, wherein the steps of relatively moving the bone pusher and the meat stripper diaphragm towards or away from one another and simultaneously moving the tubular knife and the meat stripper diaphragm towards or away from one another are accomplished respectively by simultaneously advancing and simultaneously retracting the bone pusher and the tubular knife towards or away from the meat stripper diaphragm.

41. A method of stripping meat from a bone extending through the meat comprising the steps of:
(a) urging a first portion of the bone through a meat stripper diaphragm to strip meat from the first portion of the bone;
(b) cutting meat from around a second portion of the bone not urged through the meat stripper diaphragm; and
(c) engaging the first portion of the bone to move the second portion of the bone through meat stripper diaphragm.

* * * * *